Feb. 12, 1963 J. G. GREEN ETAL 3,077,236
FORCE MEASURING SYSTEM
Filed April 15, 1959 6 Sheets-Sheet 1

INVENTORS
JOSEPH GREGORY GREEN
ROBERT W. SETTLES
MATTHEW T. THORSSON
BY

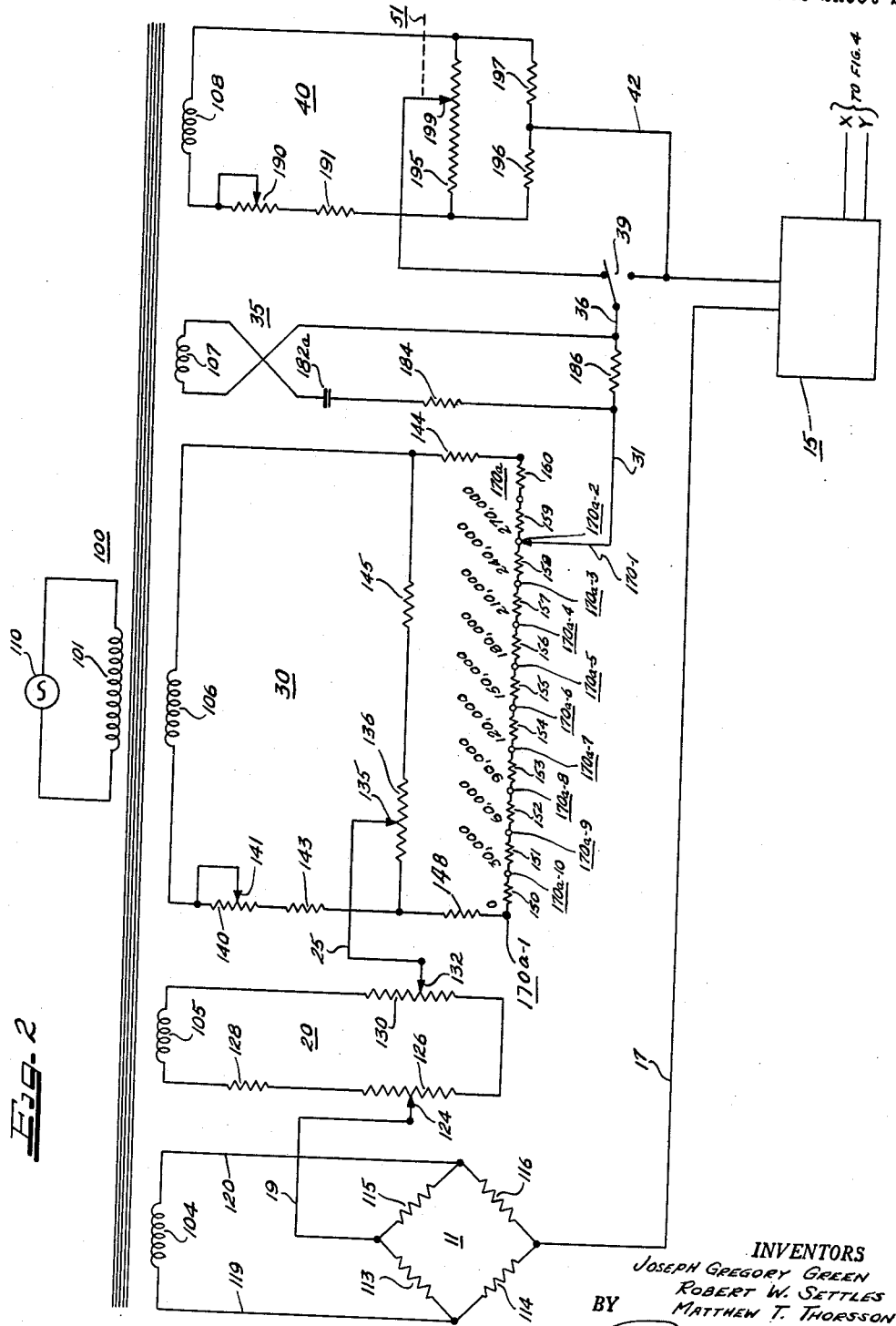

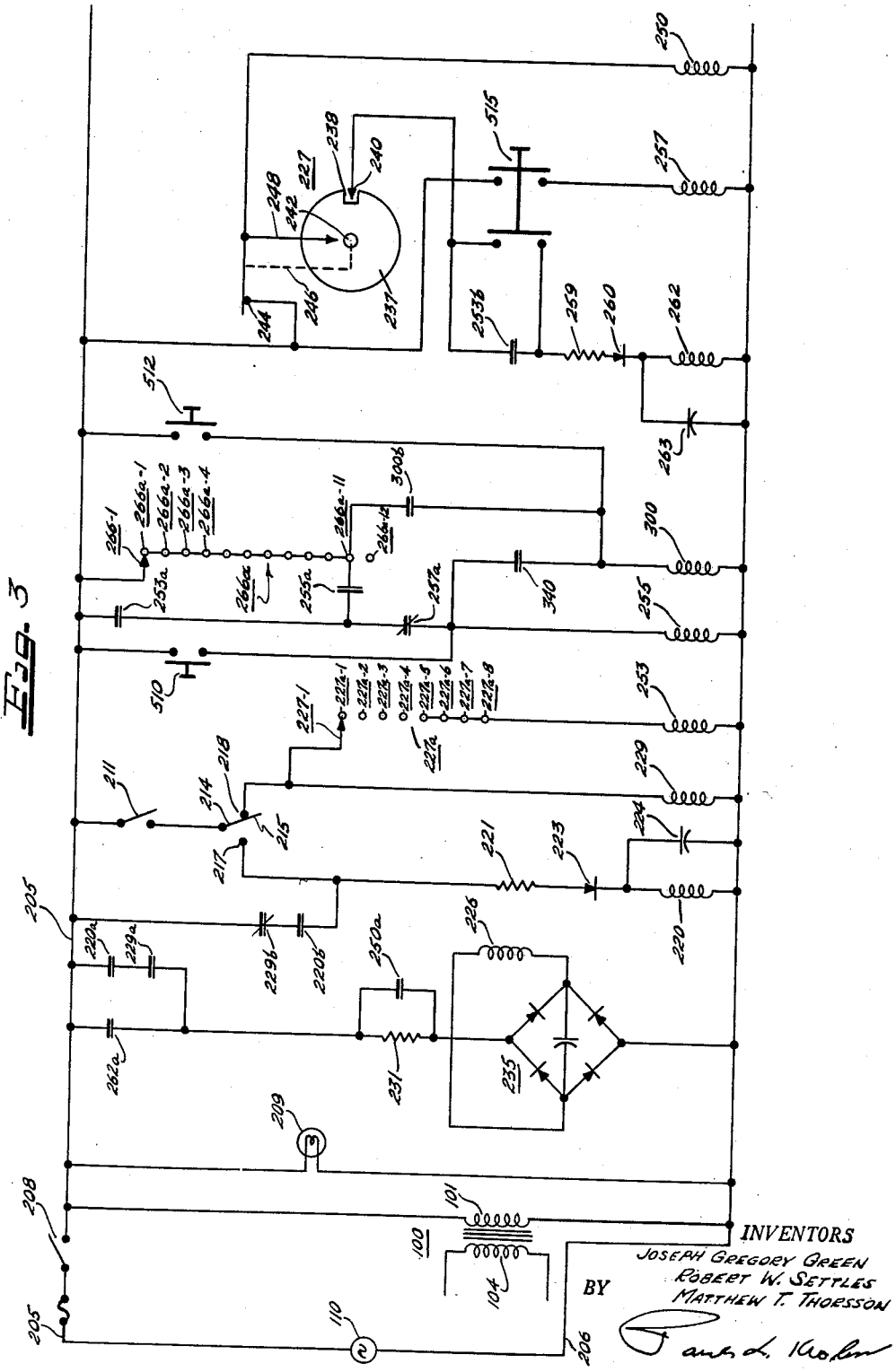

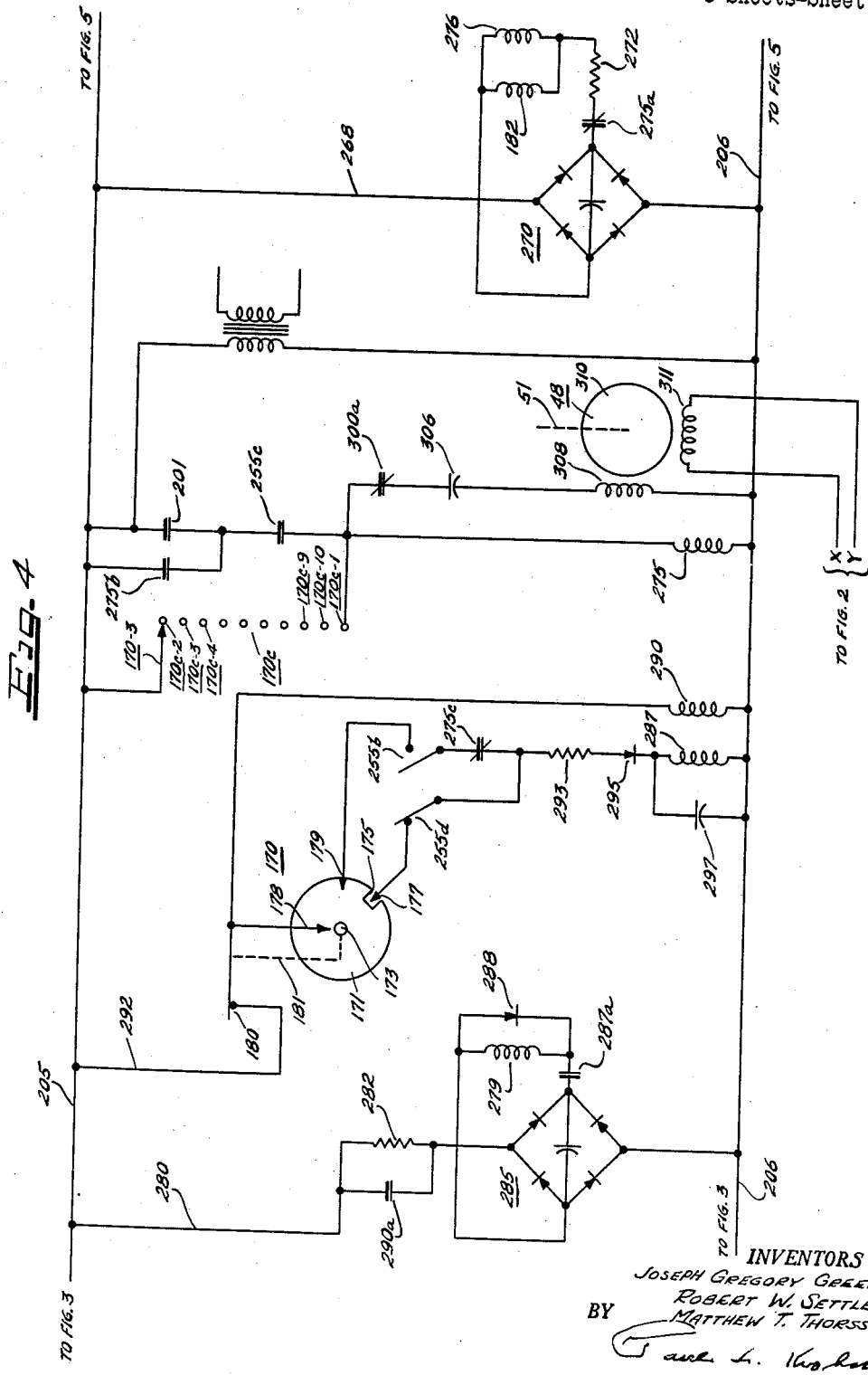

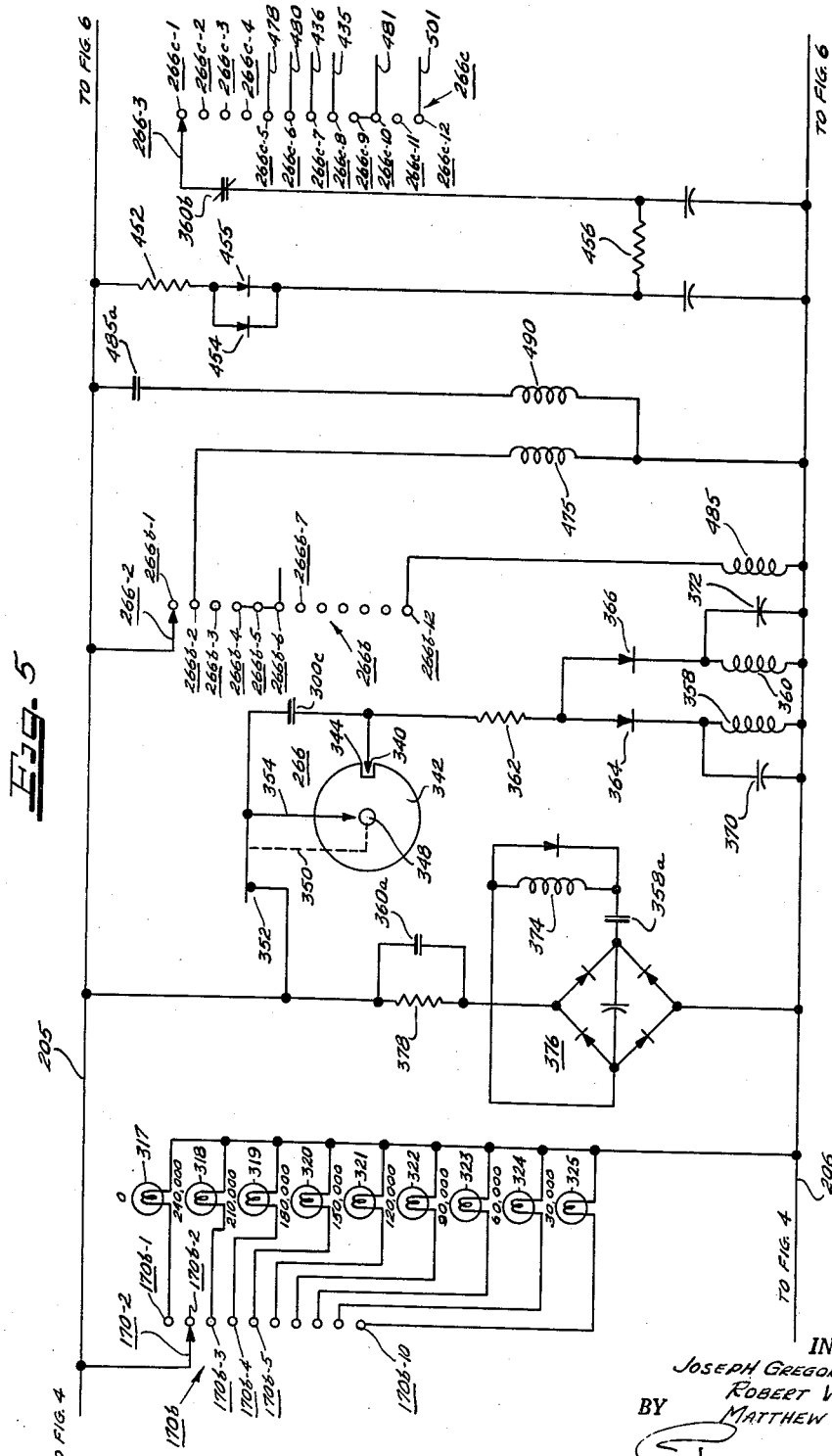

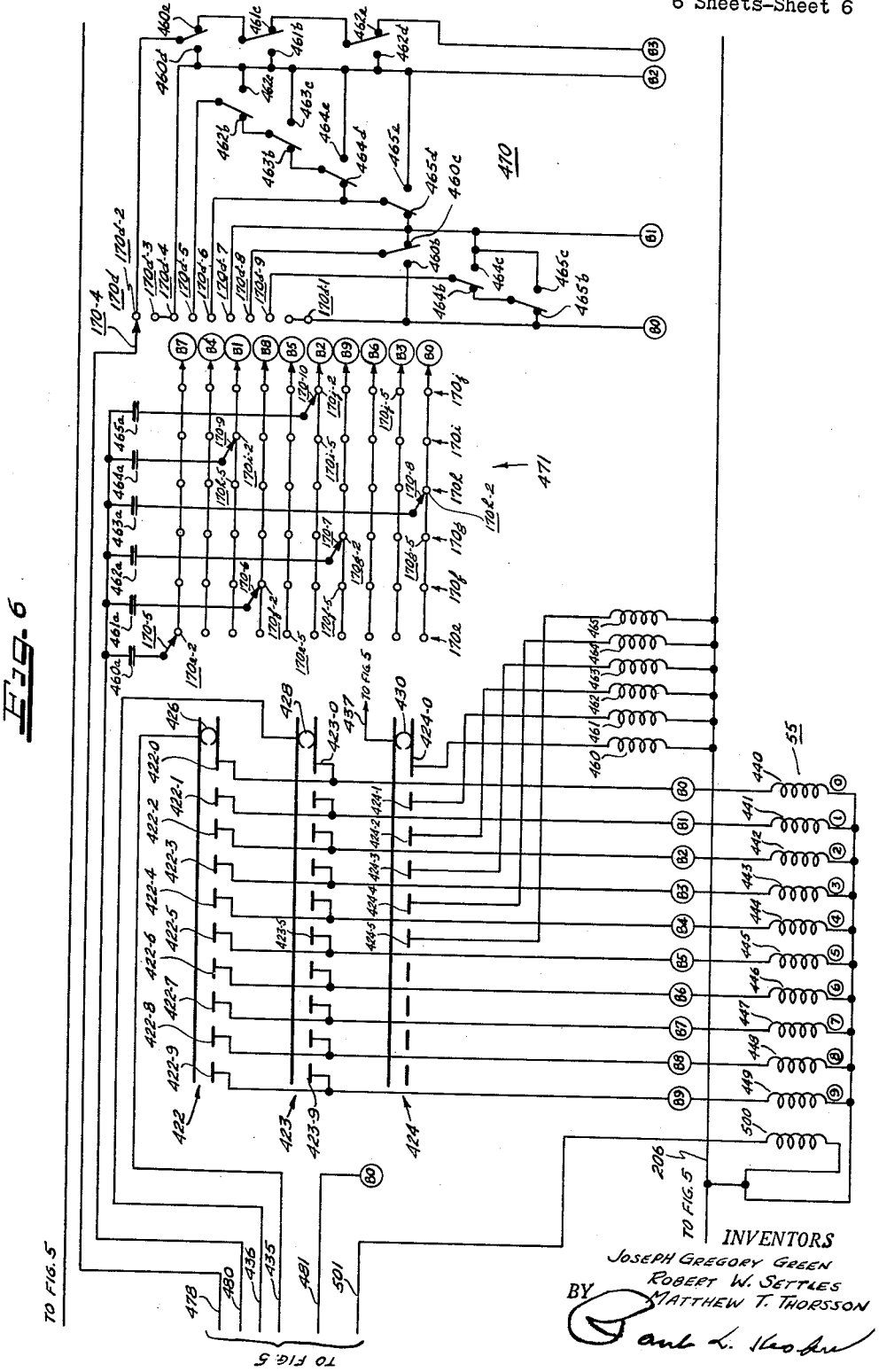

United States Patent Office 3,077,236
Patented Feb. 12, 1963

3,077,236
FORCE MEASURING SYSTEM
Joseph Gregory Green, Davenport, Iowa, and Robert W. Settles, Rock Island, and Matthew T. Thorsson, East Moline, Ill., assignors to Fairbanks, Morse & Co., Chicago, Ill., a corporation of Illinois
Filed Apr. 15, 1959, Ser. No. 806,658
11 Claims. (Cl. 177—12)

This invention relates to force measuring systems and more particularly to a system for measuring and indicating the forces resulting from objects moving rapidly over a sensing device.

The present invention may be used with only slight modifications to measure weight, pressure, heat or any other condition which can be measured using a transducer. A transducer may be defined as any device for converting a condition into a proportional voltage. Specifically, a load cell is a well known type of transducer, because it changes the force representing the weight of an object into a voltage whose magnitude varies directly as the applied weight. The present invention, while it may be used to measure any condition capable of being sensed by a transducer, may be best illustrated by an embodiment showing its use in the weighing field.

In many industrial weighing applications, the speed at which successive objects are weighed is of prime importance. In certain applications objects are conveyed along a track and are placed on a scale platform in rapid succession for weight determination. More specifically, this problem of rapid, almost continuous, weighing of individual objects in a constant stream of discrete items becomes most acute in weighing of freight cars in motion. The amount of time available for the actual weighing operation of each single freight car in a moving train is only a few seconds. Thus, for a freight train moving at 10 miles per hour the individual freight cars are in position for a weighing and recording operation for only a second or two. If the speed of the train is increased by any significant amount, the time for weighing and recording is proportionally decreased.

In the rapid weighing of successively coupled freight cars, the weight of each car is so great as to require a range changing system in the scale. For practical design considerations, the scale may have a total capacity of 300,000 pounds, but the initial chart capacity may be only 30,000 pounds by 100 pound increments. Consequently, range weights must be added to permit the reading or recording of the weight. These range weights are usually multiples of the dial capacity. For example, assuming an initial chart capacity of 30,000 pounds, and if range weights of 30,000 pounds are used and the weight of a given freight car is 195,000 pounds, 6 range weights of 30,000 pounds must be placed on the counterbalance part of the scale and the difference of 15,000 pounds is visually indicated on the chart. The total indicated weight of the 6 range weights (180,000 pounds) is added to the 15,000 pounds on the indicator to give a total reading of 195,000 pounds.

In the past it has been the practice to add range or drop weights until one more than enough counterweights are applied to the weighing scale. The addition of the extra counterweight results in an overbalance condition of the scale. The operator then removes the extra counterweight and the scale is rebalanced by an adjustable poise. The amount of weight in excess of the range weight appears on the chart and this reading is added to the total weight of the counterweights remaining in active connection to the scale.

The previous weighing practice entails at least one extra step of range weight removal which tends to slow down the weighing operation and renders the more conventional approach inadequate for high speed weighing operation.

It is therefore an object of the present invention to provide a novel weighing scale which accomplishes high speed weighing of successive objects.

It is another object of the invention to provide a novel scale which accomplishes high speed weighing of successive objects with visual and recorded weight information.

It is yet another object of the present invention to provide a novel scale which weighs successive objects at high speeds without the additional step of adding and removing an unnecessary counterweight.

The present invention is directed to a novel electrical force measuring system in which a transducer generates a voltage whose magnitude is directly proportional to the weight on a platform. The output of the transducer is connected to a first or range bridge which introduces a countervoltage in discrete amounts. This bridge acts in a manner analogous to the counterweight or drop weight mechanism in a mechanical scale. However, it differs from the conventional drop weight system in that at the initiation of the weighing cycle, it introduces a counter voltage signal equivalent to the total capacity of the scale. It is capable of reducing this voltage signal in discrete steps, each step being equal and also being equal to a multiple of the chart capacity of the scale. The transducer is also connectable selectively to a second or rebalance bridge which is made part of the circuit only after the magnitude of the voltage signal of the first or range bridge has been reduced to that range step which is no lower than an amount equal to the chart capacity below the weight of the object on the platform. The second or rebalance bridge then adds to the magnitude of the voltage signal of the range bridge sufficient voltage to bring the system to an electrical null condition.

A visual indication of the weight is accomplished by indicating the total amount of weight represented by the range bridge by means of a lamp circuit and the total amount of weight represented by the rebalance bridge with a dial and chart indicator.

A permanent record of the total weight on the scale platform is recorded by a printer after a computing means has totalled the weight represented by the range bridge and the rebalance bridge.

With the foregoing, and other objects in view, the invention is disclosed in the following specification and appended claims, one embodiment of which is shown in the accompanying drawings in which like numerals indicate like elements and in which:

FIGURES 2–6 are circuit diagrams showing in detail the electrical circuits of FIGURE 1;

Figure 1:
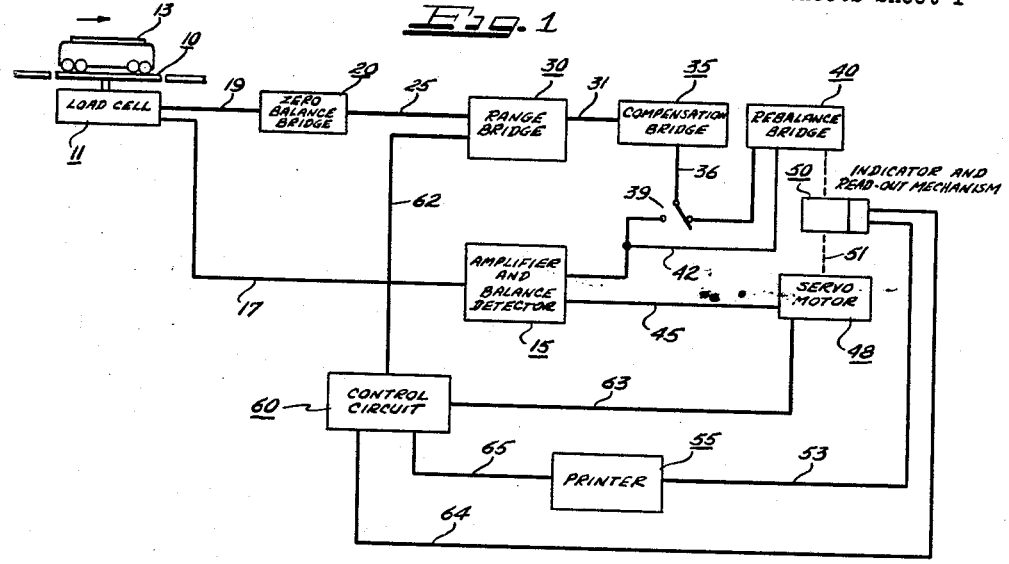
FIGURE 1 is a schematic diagram in block form showing the interconnections between the various mechanical elements and electrical circuits of the invention.

The novel force measuring system of the present invention may be most readily explained with reference to the drawings. The specific environment in which the force measuring is accomplished is that of weighing freight cars running on tracks in a freight yard. Referring now to FIGURE 1, there is therein shown the overall arrangement of the invention in block diagrammatic form. A platform 10 which is a section of railroad track is supported on a load cell 11. Load cell 11 develops a voltage whose magnitude is directly proportional to the weight of platform or track section 10 and a freight car 13 and its contents resting thereon. One side of the output circuit of load cell 11 is connected directly to an amplifier and balance detector 15 over a conductor 17. The other side of the output of load cell 11 is connected over a conductor 19 to a zero balance bridge 20 which generates a voltage in phase opposition to that of load cell 11 and of a magnitude adjustable to cancel out all except that part of the output voltage of cell 11 attributable to the weight of the freight car 13 and its contents.

Thus, the magnitude of the voltage at the output of zero balance bridge 20 is proportional and representative of the weight of the freight car 13. The output circuit of zero balance bridge 20 is connected over a conductor 25 to a range bridge 30 which generates a voltage in phase opposition to that generated by the load cell.

Range bridge 30, as will become evident hereinafter, operates in a manner analogous to that of a mechanical scale using dropweight. Thus, the voltage developed in range bridge 30 is generated in discrete steps corresponding to the ranges of the instrument. For example, the voltage developed in bridge 30, may be generated in amounts corresponding to a range of 30,000 pounds. In initial or rest step position the magnitude of voltage in the range bridge 30 is representative of 270,000 pounds with range increment being equal to initial chart capacity. The next step or decrement permits a reading of 240,000 pounds. The subsequent steps are in decrements of 30,000 pounds and the ranges can be reduced until there is no countervoltage developed in this bridge.

The output signal from bridge 30 is applied over a conductor 31 to a compensation bridge 35. The function and structure of bridge 35 will be described in greater detail hereafter.

The output signal from compensation bridge 35 is connected alternatively over a conductor 36 and a switch 39 to either the amplifier and balance detector 15 or to rebalance bridge 40. Switch 39 connects the output of bridge 35 to the amplifier and balance detector 15 until the correct range is selected by operation of the balance detector. The selection of the correct range causes in a manner to be described hereinafter, switch 39 to connect the output of bridge 35 to the input of rebalance bridge 40. The output signal from rebalance bridge 40 is connected to amplifier and balance detector 15 over a conductor 42.

After the switching of the output signal from compensation bridge 35 to rebalance bridge 40, an output signal from amplifier 15 is applied over path 45 to actuate servomotor 48 which responds to adjust rebalance bridge 40 until an electrical null condition appears at the amplifier input circuit. At the same time, servomotor 48 positions the elements of indicator and read-out mechanism 50 by a mechanical coupling 51.

The output circuit of indicator and read-out mechanism 50 is connected over a path 53 to a printer 55 whereat a permanent printed record of the weight is recorded.

A control circuit 60 which serves to establish the order of operation of the various elements heretofore described is connected to range bridge 30, servomotor 48, indicator and read-out mechanism 50, and printer 55 over paths 62, 63, 64 and 65 respectively.

The general operation of the invention will now be described with reference to the block diagram of FIGURE 1.

It is assumed that a freight car 13 is moved to scale platform 10. At this time the output circuit of compensation bridge 35 is connected over conductor 36 and switch 39 to the input of amplifier and balance detector 15. The load cell 11, zero balance bridge 20, range bridge 30 and compensation bridge 35 are now connected in series to the input circuit of amplifier 15. As the front wheels of the car enter upon platform 10, the control circuit 60 is prepared by a track switch (not shown) to initiate its control and timing function. As the wheels pass over the switch, the control circuit begins its operation.

Load cell 11 generates a voltage whose magnitude is proportional to the weight of the freight car 13, its contents and the platform 10. Zero balance bridge 20 has been set to generate a voltage equal and in phase opposition to that portion of the voltage output of load cell 11 represented by the sustained weight other than that of the freight car 13 and its contents. Thus, the voltage signal applied to the input of range bridge 30 is representative of the weight of car 13 and its contents only. In its initial condition, range bridge 30 inserts into the system a voltage in phase opposition to that generated by load cell 11 and is designed so that it produces a maximum countervoltage equal to the highest range of the scale. Thus, the magnitude of the voltage at the output of range bridge 30 is equal to the maximum countervoltage produced therein less that voltage produced by load cell 11 which is proportional to the load on platform 10. In the practical embodiment, the maximum countervoltage produced in range bridge 30 is the equivalent of 270,000 pounds and represents the highest range of the instrument.

The voltage signal from bridge 30 is applied to the input of compensation bridge 35 which is arranged to produce a voltage in phase opposition to the load cell output voltage and is equivalent to 10,000 pounds. The purpose of this compensation bridge will be explained in detail hereinafter.

The output signal from compensation bridge 35 is applied over conductor 36 and switch 39 to the input circuit of amplifier and balance detector 15.

At this time, the condition of the system is such that the voltage signal applied to the input of amplifier 15 is of the same phase as that of the voltage generated in range bridge 30. This condition occurs because the magnitude of the voltage generated in range bridge 30 far exceeds that of the transducer 11.

A short time after the first track switch has been actuated by the freight car 13, the control circuit begins to reduce the amplitude of the voltage generated in range bridge 30 in discrete steps, each step being equal to the range decrement of 30,000 pounds. As soon as the amplitude of the voltage of range bridge 30 is reduced to an amount below that of the combined voltages from load cell 11, and compensation bridge 35, the amplifier and balance detector 15 senses the reversal in phase of the voltage signal at its input. The phase of the voltage reverses because the magnitude of the voltage of the combined voltages from load cell 11 and compensation bridge 35 exceeds the magnitude of the voltage generated in range bridge 30. At this time, the control circuit is actuated by the amplifier and balance detector 15 to stop further reduction in the magnitude of the voltage generated in range bridge 30. Simultaneously, switch 39 is actuated to disconnect the output signal of compensation bridge 35 from the amplifier and balance detector 15 and connect it to the input of rebalance bridge 40.

At this time, the control circuit renders compensation bridge 35 incapable of generating further voltage.

The servomotor 48 is rendered effective to respond to the output signal from amplifier and balance detector 15 to cause rebalance bridge 40 to generate a voltage signal for rebalancing the electrical system. It will be realized that the magnitude of the input voltage signal to the amplifier and balance detector 15 is equal to the difference between the magnitude of the voltage generated by load cell 11 less the sum of the magnitude of the voltages generated by zero balance bridge 20 and range bridge 30.

Thus, the servomotor 48 is actuated until the input signal to amplifier and balance detector 15 is reduced to zero, whereupon, servomotor 48 stops. Servomotor 48 positions a dial indicator and a series of selector discs (FIG. 7) to indicate the weight visually and prepare the indicator and read out mechanism 50 for subsequent printing of the weight in a manner to be described hereinafter. Printer 55 is prepared by an output signal from control circuit 60 over path 65 and signals from indicator and read-out mechanism 50 over path 53 to print a permanent record of the weight.

Figure 7:
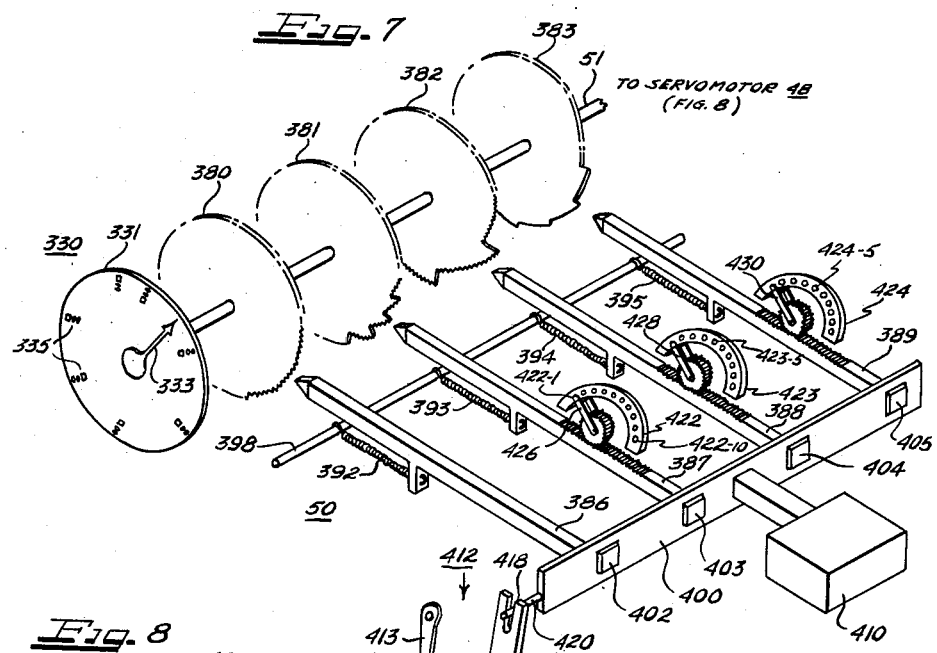
FIGURE 7 is a diagrammatic view of the mechanical part of the read-out apparatus.
Figure 8:
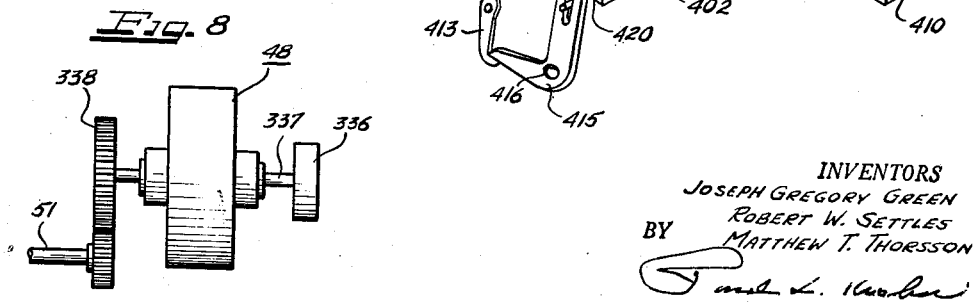
FIGURE 8 is a perspective view of the servomotor and viscous damping arrangement of the invention.

The general operation of the present invention has been described with reference to the block diagram of FIGURE 1. A detailed description of the circuits and operation of the system will now be discussed with reference to FIGURES 2–6 which are interconnected in that FIGURE 2 shows the load cell 11, zero balance bridge 20, range bridge 30, compensation bridge 35, rebalance bridge 40 and amplifier and balance detector 15. FIGURES 3–6 illustrate the electrical circuits for the servomotor 48, the indicator and read-out mechanism 50, the printer 55 and the control circuit 60. Details of the indicator and read-out mechanism 50 and the servomotor 48 are shown in FIGURES 7 and 8 respectively.

With reference to FIGURE 2, there is therein shown a power transformer 100 having a primary winding 101 and five secondary windings 104–108. A source of 60 cycle A.C. power 110 is connected to the primary winding 101 of transformer 100.

Load cell 11 comprising four resistance strain gages 113–116 arranged in the form of a Wheatstone bridge is connected to secondary winding 104 of transformer 100 over conductors 119 and 120. The load cell 11 may be any conventional resistance type strain gage commercially available. The only requirement is that its capacity be within the designed capacity of the scale, herein assumed to be 300,000 pounds. The output voltage signal from load cell 11 is connected over conductor 19 to a variable tap 124 of a potentiometer 126 in zero balance bridge 20 and over conductor 17 to the input circuit of amplifier and balance detector 15.

Zero balance bridge 20 comprises the series combination of secondary winding 105 of transformer 100, a current limiting resistor 128, input potentiometer 126 and output potentiometer 130. Zero balance bridge 20 functions to create a voltage whose phase is in opposition to that of load cell 11 and whose magnitude is equal to that part of the voltage generated in load cell 11 attributable to the weight of platform 10. By adjusting tap 132 of potentiometer 130, the proper setting of zero balance bridge 20 is achieved and it is not necessary to further adjust the bridge.

The output signal from zero bridge 20 is connected from tap 132 of potentiometer 130 over conductor 25 to the input circuit of range bridge 30. Specifically, the input circuit to bridge 30 is a tap 135 of a potentiometer 136. Range bridge 30 comprises the series combination of a secondary winding 106 of transformer 100, a span adjusting potentiometer 140, having a variable tap 141, a current limiting resistor 143 and the parallel combination of two series circuits, the first of which comprises potentiometer 136 and a resistor 145, and the second comprises two current limiting resistors 148 and 144 and a plurality of resistances 150—160.

As previously explained, range balance bridge 30 generates a voltage in phase opposition to that generated by load cell 11 and this voltage is produced in discrete amounts equal to the range steps of the scale system. The manner in which the voltage steps are produced is accomplished by means of resistors 150—160. All of these resistors are of equal value chosen so that voltage decrements of about 30,000 pounds are created as wiper 170–1 is moved from tap to tap along the resistors 150—160.

Referring now more specifically to that portion of range bridge 30 comprising resistors 150—160, it should be noted that these resistors are connected in series to taps around the periphery of a circular wafer of a stepping switch.

At this point it is appropriate to digress slightly from the detailed explanation of range bridge 30 to establish a coding system for the switch, the wiper and the taps on the switch wafer. This system will be followed for other stepping switches throughout the specification. In general, the switch will be designated by a selected base number, the wiper will be designated by the same base number followed by a second number separated therefrom by a short dash to differentiate between different wipers of the same switch, and the individual wafers of each switch will be designated by the base number plus a small letter to differentiate between the different wafers of the same switch, and the taps on each wafer will have the wafer designation plus a second number separated therefrom by a dash to designate the position of each tap from a zero or start position.

In order to clarify the above general description of the designation system used for stepping switches throughout the remainder of the specification, a specific example of the system using the stepping switch associated with the series connected resistors 150—160 is as follows: In FIGURE 4, there is shown a switch 170 which is a stepping switch of the type used in conventional step-by-step advancing circuits. A switch of this type is commercially available under the trademark "Ledex," and is manufactured by G. H. Leland, Inc., of Dayton, Ohio.

The switch 170 comprises a round metallic conductive plate 171 which is connected to a shaft 173 and is rotatable therewith. Plate 171 has a slot 175 cut in its periphery. Slot 175 is arranged to receive a wiper 177 which is electrically isolated from plate 171 when it rests in slot 175 but completes an electrical contact with plate 171 in all other positions of the plate. The wiper 177 has cam surfaces which enable it to emerge from slot 175 upon rotation of plate 171. A second wiper 178 makes electrical contact with plate 171 at all times. Also, slot 175 is arranged to receive a wiper 179 which is electrically isolated from plate 171 when it rests in slot 175, but completes an electrical contact with plate 171 in all other positions of the plate. Plate 171 rotates in steps to complete one revolution before wiper 177 again rests in slot 175, preparatory to a subsequent revolution of plate 171. The driving mechanism of plate 171 will be hereinafter described. Switch 170 further has a plurality of wafers 170a (FIG. 2), 170b (FIG. 5), 170c (FIG. 4), 170d (FIG. 6) and 170e–170j (FIG. 6). These wafers are in spaced coaxial arrangement, transverse to shaft 173. Wafers 170a–170j are fixed in position and do not rotate. Each of the wafers is a disc of insulating material, circular in form, having ten contacts spaced at equal intervals one from another, immediately inside its periphery. For convenience of explanation, the contacts for each wafer are shown in a straight line although they are, in fact, in a circular pattern near the outer edge of their associated wafer. The contacts are numbered 1–10 and have a prefix, the designation of the wafer on which they appear. Thus, contact 1 of wafer 170a is designated 170a–1. The same system is followed for the other contacts of each of the wafers.

Each of the wafers 170a–170j has a wiper 170–1 to 170–10 associated therewith respectively. Wipers 170–1 to 170–10 are connected to shaft 173 and rotate therewith to contact in sequence the contacts 1–10 of their respective wafers. Switch 170 also has a contact 180 which is opened and closed by the action of a cam follower, indicated by dashed line 181. Cam follower 181 is connected to shaft 173 so as to open and close contact 180 once for each step, or ten times for each revolution of plate 171. The mechanical arrangement of cam follower 181 is conventional and is not illustrated in detail.

Before returning to the detailed description of the invention it may be well at this point to discuss another symbol and designation system. The symbol for the contacts controlled by the relay windings in the electrical diagram are herein shown as the combination of a heavy straight line above, slightly separated from and parallel to a thin straight line. Those contacts which are open when their corresponding relay winding is not energized are shown as above described. Those contacts which are closed when their corresponding relay winding is de-energized are shown as above and with a straight line intersecting both parallel lines. Further the contacts associated with and controlled by any selected relay winding are designated with the same number as the winding plus a small letter following the numerical designation. Additionally, if more than one set of contacts is controlled by a selected relay winding a different small letter is assigned to each set of contacts while the same numerical designation remains for each set. Thus, for example, a relay winding designated 1 may control contacts 1a, 1b, and 1c.

Condensers are shown in the drawings as a straight line above and separated from an arcuate line of equal thickness with the straight line.

Reverting now to the more detailed description of the invention and more particularly to FIGURE 2, the output signal from range bridge 30 is connected from wiper 170–1 over a conductor 31 to compensation bridge 35. Compensation bridge 35 comprises the series combination of secondary winding 107 of transformer 100, contacts 182a, a current limiting resistor 184 and a voltage generating resistor 186. Compensation bridge 35 is arranged to generate a voltage representative of 10,000 pounds in phase with that generated in range bridge 30. However, upon de-energization of the relay winding 182 (FIG. 4), contacts 182a open and no further voltage is generated in compensation bridge 35. This latter sequence of operation will be described hereinafter.

The output signal from compensation bridge 35 is connected from one side of resistor 186 over conductor 36 and over switch 39 to either rebalance bridge 40 or the input circuit of amplifier and balance detector 15 depending upon the condition of the switch.

Rebalance bridge 40 comprises the series combination of secondary winding 108 of transformer 100, span adjust resistor 190, a current limiting resistor 191 and the parallel combination of a rebalance potentiometer 195 and resistors 196 and 197.

The voltage from the prior circuits is applied to the input of rebalance bridge 40 over a tap 199 on potentiometer 195. The position of tap 199 is adjusted by means of a mechanical linkage 51 connected to servomotor 48. Rebalance bridge 40 serves to reduce the voltage signal at the input of amplifier and balance detector 15 to zero as effected by the operation of the servomotor.

The output circuit of rebalance bridge 40 is connected from the junction of resistors 196 and 197 over conductor 42 to the input of amplifier and balance detector 15.

Amplifier and balance detector 15 may be of any known design, such as that more fully described and claimed in Patent No. 2,882,035, entitled "Weighing Scale System With Weight Recorder," issued on April 14, 1959, to Louis J. Lauler and Matthew T. Thorsson and assigned to the present assignee. The amplifier portion of amplifier and balance detector 15 amplifies the signal applied thereto and applies its amplified output signal to the balance detector portion and also to the control winding of servomotor 48 to effect operation of the servomotor in a manner to be described hereinafter. The balance detector controls the opening and closure of contacts 201 (FIGURE 4). When the output signal from the amplifier is zero, contacts 201 open and at any time that there is an output signal from the amplifier contacts 201 remain closed.

To continue the detailed explanation of the operation of the present invention, attention is now directed to FIGURES 3–6 which show the control circuit 60, servomotor 48, indicator and read-out mechanism 50 and printer 55.

For purposes of the example, it will be assumed that a freight car having a total weight of 195,000 pounds approaches track section 10. It will be further assumed that freight car 13 is of the convention type having a leading and a trailing set of trucks, each having two pairs of wheels. 60 cycle A.C. power is applied from source 110 over lines 205 and 206 (FIGS. 3–6) by closure of on-off switch 208. Closure of switch 208 applies line voltage to primary winding 101 of transformer 100 which applies power to the secondary windings 104–108 of the transformer. (Only secondary winding 104 is herein shown.) A neon indicating lamp 209 lights to indicate that main power to the unit is on.

To provide power to a counting circuit, an off-on switch 211 is closed. A track switch 214 is located at the left of track section 10 (as viewed in FIGURE 1) and is actuated as the leading wheels of the first truck of freight car 13 cross over this switch. Switch 214 comprises an armature member 215 and two contacts 217–218. Armature 215 normally rests on contact 218 but moves to contact 217 when the switch is actuated by any pair of wheels on the freight car.

Upon actuation of track switch 214, armature 215 moves to contact 217 to complete a circuit for relay shunted by a condenser 24 to provide a short time delay winding 220, the circuit extending from line 205, over manually closed switch 208, switch 211, contacts 217, a current limiting resistor 221, a rectifying diode 223, and relay winding 220 to line 206. Relay winding 220 is shunted by a condenser 224 to provide a short time delay before it releases upon interruption of its energizing circuit. Relay winding 220 controls closure of contacts 220a and 220b. Contacts 220a prepare a circuit for energization of a stepping coil 226 associated with a stepping switch 227.

At its contacts 220b, relay winding 220 completes its own holding circuit from line 205, over switch 208, normally closed contacts 229b of relay winding 229, contacts 220b, current limiting resistor 221, rectifier 223 and the winding of relay 220 to line 206.

As the front wheels of the first truck of car 13 pass over the track switch 214, the switch releases so that its armature 215 falls back against contacts 218. At this time an energizing circuit is completed for relay coil 229 from line 205, over switch 208, line 205, switch 211, contacts 218 and the winding of coil 229 to line 206.

Relay 229 operates and operates its contacts 229a and 229b.

Contacts 229a of relay 229 close to complete an energizing circuit for coil 226 of stepping switch 227 from line 205, over switch 208, contacts 220a, contacts 229a, current limiting resistor 231, the bridge rectifier 235, and the winding of coil 226 to line 206. Rectifier 235 is a full wave rectifier to provide current for coil 226 which is connected across the rectifier output terminals.

Upon energization of coil 226, which is the operating coil for switch 227, stepping switch 227 commences operation and is advanced one step to its next position. Thus, wiper 227–1 is moved from tap 227a–1 to tap 227a–2. The construction of switch 227 is analogous to that previously described for stepping switch 170, and it comprises a plate 237 having a notch 238. A wiper 240 rests in notch 238 until plate 237 begins rotation. Upon rotation of plate 237 and its shaft 242, contacts 244 are opened by means of a cam follower 246. A wiper 248 is connected from contact 244 to plate 237.

Initially a relay coil 250 associated with stepping switch 227 is energized over a path from line 205, over switch 208, line 205, contacts 244 and winding 250 to line 206.

Relay coil 250 controls operation of contacts 250a which short out current limiting resistor 231 after the current pulse to coil 226. The purpose of coil 250 is to leave current limiting resistor 231 in the circuit to prevent excess current from flowing through coil 226 during the pulse and remove this resistor from the circuit after the pulse of current through coil 226.

Upon energization of coil 229, as previously described, its contacts 229b are opened to interrupt the previously described holding circuit for relay coil 220. Relay coil 220 relaxes to open contacts 220a and 220b. The opening of contacts 229a interrupts the current flow to stepping switch coil 226. The closing of contacts 229b prepares an energizing circuit for relay 220.

At this juncture, the stepping switch has moved one step ahead with its wiper 227–1 now resting on tap 227a–2 of wafer 227a but the remainder of the system restores to its original condition.

As the freight car 13 moves forward, the second set of wheels on the first truck actuates track switch 214 to pull armature 215 to mate with contact 217, as in the previous case. The same operation as that previously described occurs and stepping switch 227 moves wiper 227–1 to tap 227a–3 of wafer 227a.

As the leading wheels of the second truck cross switch 214, the same advancing action of switch 227 occurs and wiper 227–1 moves to tap 227a–4 of wafer 227a.

As the last set of wheels of the second truck of freight car 13 actuates track switch 214, again stepping switch 227 moves wiper 227–1 to tap 227a–5 in the manner previously described. When the last set of wheels completes its journey over track switch 214, the armature 215 thereof returns to contact 218. At this point a circuit is completed for the energization of coil 253 from line 205 from line 205, over switch 208, line 205, switch 211, armature 215, contact 218, wiper 227–1, tap 227a–5 and the winding of coil 253 to line 206.

Relay coil 253 is energized and its contacts 253a and 253b are closed. Closure of contacts 253a completes a circuit for energization of coil 255 from line 205, over switch 208, line 205, contacts 253a, normally closed contacts 257a, and the winding of coil 255 to line 206. Closure of contacts 253b completes a homing circuit for stepping switch 227 extending from line 205, over switch 208, line 205, contacts 244, wiper 248, plate 237, wiper 240, contacts 253b, current limiting resistor 259, rectifier 260, and the winding of coil 262 to line 206. A condenser 263 is connected across the winding of coil 262 to provide a short time delay.

Relay coil 262 is energized and closes its contacts 262a which constitute a short around contacts 220a and 229a. Contacts 262a complete an energizing circuit for coil 226 which is the operating coil for stepping switch 227. As stepping switch 227 advances, cam follower 246 opens contacts 244 to interrupt the energizing circuit for coil 262, whereupon contacts 262 again open.

This stepping action has moved wiper 227–1 to tap 227a–6. Upon completion of this step, contacts 244 are again closed by cam follower 246 to again complete the energizing circuit for coil 262. This stepping process is repeated in this fashion with the alternate closure and opening of contacts 262 and the stepping of switch 227 until wiper 227–1 again rests on tap 227a–1. At this time slot 238 which has been stepped around by rotation of plate 237 again receives wiper 240, whereupon the energizing circuit for coil 262 is finally interrupted. As wiper 227–1 moves from tap 227a–8 to its home position on tap 227a–1, the energizing circuit for relay 253 is interrupted. Relay 253 relaxes and at its contacts 253a reopens the original energizing circuit for relay 255 which, however, is held energized over its own holding circuit. At its contacts 253b, relay 253 further opens the stepping circuit for stepping switch 227 and prevents its further rotation.

At this time the function of stepping switch 227 is at an end in the weighing process. It has served to ascertain that freight car 13 is fully upon track section 10 by, in effect, counting the sets of wheels. It has further alerted the weighing portion of the scale system to begin its function by energization of control relay 255.

It will be recalled that control relay 255 was energized during the counting function of stepping switch 227. Upon energization, control relay 255 closes contacts 255a (FIG. 3), 255b, 255c (FIG. 4) and opens normally closed contacts 255b (FIG. 4). Closure of contacts 255a completes a holding circuit for coil 255 extending from line 205, over switch 208, line 205, wiper 266–1, taps 226a–1 to 266a–11 of wafer 226a, contacts 255a, normally closed contacts 257a, and the winding of coil 255 to line 206.

Before continuing with a detailed explanation of the weighing operation, it will be recalled that load cell 11 generates a voltage signal whose magnitude is proportional to the weight of the platform 10 and any object or material on this platform. In this case the object is freight car 13 and its contents. The output signal from load cell 11 is applied to a zero balance bridge 20 which is preset to eliminate the effect of the weight of platform 10. This is accomplished in a manner well known to those skilled in the art and is fully described in the aforementioned issued patent. It is sufficient to note that the voltage signal at the output of zero balance bridge 20 is of a magnitude proportional only to the load on the platform.

The voltage signal from the output of zero balance bridge 20 is applied to range bridge 30 which in the present invention functions to introduce a countervoltage in discrete steps, each step representing 30,000 pounds.

The output signal from the range bridge 30 which is the algebraic addition of the voltage signal applied to the bridge and the voltage generated therein is applied to the compensation bridge 35.

Compensation bridge 35 introduces into the system a voltage representative of 10,000 pounds which is in phase with that generated in the range bridge. It will be recalled that a set of contacts 182a are in series with the voltage generating resistor 186 in the compensation bridge 35. When these contacts are closed, current flows through resistor 186 to generate the voltage representative of 10,000 pounds hereinbefore mentioned. When contacts 182a are open, no current from winding 107 of transformer 100 flows through resistor 186 and no compensation voltage is generated therein.

The operation of contacts 182a is controlled by a relay coil 182 (FIG. 4) The energizing circuit for relay coil 182 extends from line 205, over switch 208, line 205, conductor 268, full wave rectifier 270, thru the winding of coil 182 in the output circuit of rectifier 270, a current limiting resistor 272, normally closed contacts 275a of relay winding 275 and thence to line 206. Shunted across the winding of coil 182 is a second relay winding 276 which is energized simultaneously therewith. Relay coil 276 is the operating winding for switch 39 (FIGS. 1 and 2) which connects the output of compensation bridge 35 to the amplifier and balance detector 15 when winding 276 is energized and to the input of rebalance bridge 40 when winding 276 is de-energized.

Initially, therefore, upon closure of on-off switch 208, winding 182 and 276 are energized. Consequently, contacts 182 are closed to actuate compensation bridge 35 and the armature of switch 39 is moved to connect the output signal of the compensation bridge 35 directly to the input circuit of amplifier and balance detector 15.

At this point it is evident that the voltage applied to the input circuit of amplifier and balance detector 15 is the algebraic sum of the voltage generated in the load cell 11, the zero balance bridge 20, the range bridge 30 and the compensation bridge 35. It has been assumed that the capacity of the bridge far exceeds any load that will be applied to track section 10 and for this reason the voltage signal generated in the range bridge 30 exceeds that of the algebraic sum of the voltages generated in load cell 11, zero bridge 20 and compensation bridge 35.

For purposes of further explanation it will still be assumed that the freight car 13 and its contents weigh 195,000 pounds. As shown in FIGURE 2 of the drawing, the voltage applied to the input terminals of amplifier and balance detector 15 represents the alegebraic sum of the voltage of load cell 11 (195,000 pounds+the weight contributed by the track section 10), the counter voltage produced in zero balance bridge 20 (the weight contributed by the track section 10), the countervoltage generated by range bridge 30 (270,000 pounds) and the voltage generated in compensation bridge 35 (10,000 pounds). The algebraic sum of all these voltages as applied to the input circuit of amplifier and balance detector 15 is representative of 85,000 pounds. This voltage is in phase with that produced in range bridge 30.

In order to rebalance the scale system so that the weight of the freight car and its contents can be recorded, it first becomes necessary to reduce the voltage generated in the range bridge 30 by steps until the voltage produced therein is in the proper range which, in this case, is the 180,000 pound range since the weight on the track section 10 is 195,000 pounds. Following the establishment of the proper range, then the difference of 15,000 pounds is added to the 180,000 pounds by the action of rebalance bridge 40.

To accomplish the proper reduction of voltage in range bridge 30, it will be recalled that when counting switch 227 completed its count of the four sets of wheels of freight car 13, a control relay winding 255 was energized.

Not only did this relay, when energized, complete its own holding circuit over its contacts 255a, but it also initiated the operation of weight control stepping switch 170 by closure of contacts 255b. The energizing circuit for the winding of stepping coil 279 (FIG. 4) extends from the line 205, over switch 208, line 205, conductor 280, a current limiting resistor 282, the input circuit of a full wave rectifier 285, the winding of coil 279 in the output circuit of rectifier 285, and contacts 287a to line 206. A spark suppression circuit comprising a rectifier 288 is shunted across winding 279. A pair of contacts 290a are shunted across current limiting resistor 282 for the purpose of controlling the surge of current through winding 279.

To energize the winding of stepping coil 279 it is necessary to effect closure of contacts 287a which are in series therewith. The energizing circuit for relay coil 287 which controls closure of contacts 287a extends from line 205, over switch 208, line 205, conductor 292 (FIG. 4), contacts 180, wiper 178 of switch 170, plate 171, wiper 179, contacts 255b, normally closed contacts 275c, current limiting resistor 293, a rectifier 295 and the winding of relay 287 to line 206. A time delay condenser 297 is shunted across winding 287 to prevent premature opening of contacts 287a upon interruption of the above described energizing circuit.

Upon closure of contacts 287a, coil 279 is energized and causes plate 171 to rotate one step. As plate 171 rotates through an angle of about 36 degrees, cam follower 181 operates to open contacts 180, thus interrupting the energizing circuit for relay 287. Relay 287 releases and opens contacts 287a to deenergize stepping coil 279. Simultaneously, relay 290 is de-energized and its contacts 290a open to remove the shunt across current limiting resistor 282.

In its initial step, switch 170 has moved each of its associated wipers 170–1 to 170–10 from tap 2 to tap 3. It should be pointed out at this point that the rest or home position for the wipers 170–1 to 170–10 is on tap 2 of their respective wafers.

Referring now more specifically to wafer 170a and wiper 170–1 which are associated with range bridge 30, wiper 170–1 is stepped from tap 170a–2 to tap 170a–3. This change in wiper position removes resistance 158 from the voltage generating circuit and the countervoltage now developed in range bridge 30 represents 240,000 pounds.

The stepping sequence of switch 170 is repeated because its cam follower 181 again closes contacts 180 to reenergize relay winding 287. Relay 287 operates and closes its contacts 287a to allow another pulse of current to flow through stepping switch coil 279. This pulse of current causes plate 171 to advance another 36°, thus moving each of the wipers 170–1 to 170–10 to the next or number 4 tap on their respective wafers 170a–170j.

Again as plate 171 and shaft 173 rotate, cam follower 181 opens contacts 180 to interrupt the energizing circuit for relay coil 279 in the manner hereinbefore discussed.

At this step the effect of resistor 157 is removed from the voltage generating circuit of range bridge 30 and the countervoltage being developed under these circumstances is 210,000 pounds. The span of measurement for the instrument is now from 210,000 to 240,000 pounds.

At this time the voltage signal to the amplifier and balance detector has been reduced to a voltage whose magnitude represents 5000 pounds.

Again as plate 171 completes its angular rotation of 36°, cam follower 181 again closes contacts 180 to complete the aforedescribed energizing path for relays 287 and 290. These relays operate and at their respective contacts 287a and 290a cause current to flow through stepping winding coil 279. Switch 170 moves wipers 170–1 to 170–10 to tap 5 on their respective wafers 170a to 170j.

Returning again to wafer 170a in range bridge 30, wiper 170–1 has been stepped to tap 170a–5. This movement removes resistor 156 from the countervoltage generating circuit of range bridge 30 which now has an output signal representative of 180,000 pounds and the span of measurement of the instrument lies between 180,000 and 210,000.

At this point, the phase of the voltage applied to the amplifier and balance detector was changed from being in phase with the voltage produced in range bridge 30 to a condition of being in phase with the output voltage from load cell 11. This occurred because the algebraic addition of the voltage generated in each of the series bridge circuits (load cell 11, zero bridge 20, range bridge 30 and compensation bridge 35) results in an excess of voltage in phase with that of the load cell 11. For example, the magnitude of the output voltage from load cell 11 still represents the weight of freight car 13 and its contents (195,000 pounds) plus the weight of track section 10. The magnitude of the voltage of zero bridge 20 is such as to cancel that portion of the voltage generated by load cell 11 attributable to the weight of track section 10. The magnitude of the countervoltage generated in range bridge 30 represents 180,000 pounds and that generated in compensation bridge 35 represents 10,000 pounds with the latter voltage being in phase with that of the range bridge. The algebraic sum of these voltages represents 5,000 pounds in excess of that generated by range bridge 30 and compensation bridge 35.

As the voltage applied to the input circuit of amplifier and balance detector 15 changes from one phase to another it must of necessity pass through a condition of no voltage across the input of amplifier and balance detector 15. As this zero input voltage condition occurs, the balance detector portion causes balance detector contacts 201 (FIG. 4) to close. The specific electrical circuitry for accomplishing this is well known in the art and is now fully described and claimed in the aforementioned issued patent to Lauler et al. It is sufficient for purposes of the present invention to recall that when there is a voltage applied to the input circuit of amplifier and balance detector 15 that is in phase with the voltage generated in range bridge 30 contacts 201 are open and upon a condition of voltage phase reversal the contacts 201 close and remain closed.

Closure of balance detector contacts 201 completes an energizing circuit for relay 275 which circuit extends from line 205 (FIG. 3) over switch 208, line 205 (FIGS. 3 and 4), contacts 201, contacts 225c and the winding of relay coil 275 to line 206. Relay 275 operates and at its contacts 275a (FIG. 4) opens the energizing circuit for relay coils 182 and 276. At its contacts 275b it establishes its own holding circuit extending from line 205 (FIG. 3), over switch 208, line 205 (FIGS. 3 and 4), contacts 275b, contacts 255c and the winding of relay 275 to line 206; at the same time normally closed contacts 275c in the energizing circuit for relay coil 287 associated with the advancing circuit for stepping switch 170 open, and the relay winding 287 is de-energized.

The energization of relay winding 275 therefore has a fourfold effect. First, it establishes its own holding circuit; second, by de-energizing relay winding 182, it opens the circuit for compensation bridge 35 and effectively removes its influence from the circuit (thus removing the 10,000 pound equivalent voltage from the system); third, by de-energizing the relay winding 276, it allows the armature of switch 39 (FIG. 2) to return to its upper position and connect the rebalance bridge 40 in series with the load cell 11, zero balance bridge 20, range bridge 30 and compensation bridge 35; and fourth, by opening the energizing circuit of relay 287 it prevents further advancement of stepping switch 170.

At the same time that the balance detector contacts 201 effected energization of relay coil 275, they also completed an energizing circuit for the reference winding 308 of servomotor 48; the energizing circuit extending from line 205 (FIG. 3), over switch 208, line 205 (FIGS. 3 and 4), contacts 201, contacts 225c, normally closed contacts 300a, a 90° phase shift condenser 306, and reference winding 308 to line 206.

Servomotor 48 comprises a rotor 310, a reference winding 308 and a control winding 311. Control winding 311 is connected to the output circuit of amplifier and balance detector 15 and is energized whenever there is an input voltage applied to the amplifier. However, as the servomotor is a two phase device, its rotor 310 will not turn unless there is current flowing in the reference winding 308 at the same time that current flows in the control winding. Absence of current in either winding causes the servomotor 48 to cease rotation. The rotor 310 of servomotor 48 rotates in a direction dependent upon the phase of the input voltage to amplifier 15.

The rotor 310 of servomotor 48 is connected by a shaft 51 to the wiper 199 of potentiometer 195 in the rebalance bridge 40.

It will be recalled that the voltage generated in compensation bridge 35 is effectively removed from the system and the rebalance bridge 40 is connected in series with the other bridges. Therefore, the voltage applied to the input of amplifier and balance detector 15 represents the algebraic sum of the output voltage of zero bridge 20 (195,000 pounds) less the voltage generated in the range bridge (180,000 pounds) or 15,000 pounds. To rebalance the weighing system, servometer 48 is energized in the above-discussed fashion.

As rotor 310 of servomotor 48 rotates because of the combined torque effect of the currents in reference winding 308 and control winding 311, it moves tap 199 along potentiometer 195. As tap 199 moves (to the right in FIG. 2), it increases the voltage generated in rebalance bridge 40. This voltage is in phase with that generated in range bridge 30 so that the magnitude of the voltage applied to the input circuit of amplifier and balance detector 15 diminishes as the magnitude of the voltage generated in rebalance bridge 40 increases. As the magnitude of the voltage applied to amplifier and balance detector 15 reaches zero, there is no further current flow in control winding 311 of servomotor 48. Consequently, no further rotational torque is generated and the servomotor 48 stops.

At this point the magnitude of the voltage generated by load cell 11 is completely counterbalanced by the sum of the series voltage generated in zero balance bridge 20, range bridge 30 and rebalance bridge 40. Thus, now, the weighing function of the invention is completed.

The operation of the weighing function of the present invention is the same for almost all objects on the platform or track section 10. If, however, the weight of the object is such that the range bridge 30 need not produce any countervoltage; that is, when the weight of the object is between 0 and 60,000 pounds, the lowest span of measurement of the instrument, then, the manner hereinbefore described, wiper 170-1 is advanced to tap 170a-1 of wafer 170a, and wiper 170-3 is advanced to tap 170c-1 of wafer 170c whereat it completes an energizing circuit for reference winding 308 of servomotor 48, which circuit extends from line 205 (FIG. 3), over switch 208, line 205 (FIGS. 3 and 4), wiper 170-3, tap 170c-1 of wafer 170c, contacts 300a, condenser 306, and reference winding 308 to line 206. This energizing circuit bypasses the contacts 201 of balance detector 15 and immediately initiates operation of the servomotor 48. Simultaneously, the energizing circuit for relay 275 is completed and its functions of removing the voltage from compensation bridge 35 and connecting rebalance bridge 40 into the input circuit for amplifier and balance detector circuit 15, as previously discussed, are accomplished.

Thus, under this latter condition, the function of servomotor 48 is immediately effective without waiting for closure of the balance detector contacts 201.

Also, if the weight of the object on platform 10 exceeds 270,000 pounds but is below 300,000 pounds, the phase of the voltage signal applied to amplifier and balance detector 15 is such as to immediately close contacts 201 in the balance detector. Closure of these contacts energizes reference winding 308 of servomotor 48 and causes it to operate. Simultaneously, closure of contacts 201, completes the above-described energizing pattern for relay 275. Relay 275 operates and at its contacts 275b, completes its own holding circuit; at its contacts 275c, it prevents stepping switch 170 from rotation, and at its contacts 275a, interrupts the energizing circuit for relays 182 and 276. Relay 182 effects opening of its contacts 182a in compensation bridge 35 and removes its effect from the circuit. Relay 276 moves the armature of switch 39 to its upper position to connect rebalance bridge 40 in series with the other bridges and with amplifier and balance detector 15.

Servomotor 48 then rebalances the current by operating rebalance bridge 40 in the manner previously described.

Before considering the manner in which a printed record of the weight of the freight car 13 is accomplished, the presentation of visual weight indication follows.

It will be recalled that in the example, the freight car 13 and its contents weighed 195,000 pounds. Also stepping switch 170 moved its associated wipers 170-1 to 170-10 to their respective taps 170a-5 to 170j-5. Referring now to wafer 170b (FIG. 5), it will be evident that the advancement of wiper 170-2 to tap 170b-5 of wafer 170b completes an energizing circuit for a lamp 320 of the series of lamps 317—325. Each of the lamps 317—325 is connected to a selected one of the taps 170b-1 to 170b-10 of wafer 170b, with the exception of tap 170b-2 which is the home or rest position.

Lamps 318 to 325 visually represent the weight equivalent voltage generated in range bridge 30 and establish a visual indication of the weight range in which the object on track section 10 falls. Lamps 318—325 have associated therewith plates (not shown) which show the weights 240,000 to 30,000 in steps of 30,000 pounds respectively. Lamp 317 has associated therewith a plate (not shown) indicating that the range bridge 30 has introduced no voltage into the system. Thus in the given example, lamp 320 is energized over the afore described circuit and indicates to the operator that the weight of freight car 13 and its contents lies between 180,000 and 210,000 pounds. The operator then adds 180,000 pounds to the amount represented by rebalance bridge 40 which is indicated in the following manner.

Referring now to rebalance bridge 40, it will be recalled that after the proper range (180,000 pounds) was established by range bridge 30, rebalance bridge 40 added a voltage equivalent of 15,000 pounds to fully rebalance the weighing system. This was accomplished by means of servomotor 48 which was actuated by the output signal from amplifier and balance detector 15, until complete balance was reached whereupon the servomotor 48 stopped.

Referring now to FIGURE 7, there is therein shown an indicator 330 having a chart member 331 and a pointer 333. Pointer 333 is connected to the shaft 51 of servomotor 48 and is rotatable therewith to indicate visually the weight of material on the scale platform 10 in excess of that amount reduced by the countervoltage generated in range bridge 30. Chart member 331 has numerical data 335 which with pointer 333 are read to give the weight to be added to the range weight indicated by one of the lamps 317—325. The remaining elements of FIGURE 7 will be discussed hereinafter in conjunction with the explanation of the printing action of the invention.

The operator now visually notes that range bridge 30 has introduced a voltage equivalent to 180,000 pounds and that indicator 330 indicates that an additional 15,000 pounds have been introduced by rebalance bridge 40. The total of these two visual indications equals 195,000 pounds, the assumed weight of the freight car 13 and its contents.

In the practical operating embodiment of the invention, it was found that the servomotor 48 had an undesirable amount of inertia and was too sensitive in its response to the signal from amplifier and balance detector 15. In order to reduce the sensitivity of response of the servomotor 48, a viscous damper 336 (shown in FIG. 8) of conventional manufacture is connected by a shaft 337 to the rotor of servomotor 48. Servomotor 48 is also connected to shaft 51 over a reduction gear 338.

For explaining the operation of the invention in producing a printed record of the weight of the freight car 13, reference may be had to FIGURES 3 and 5–7. Referring now to FIGURE 3, there is therein shown a second track switch 340. Track switch 340 is coupled to track section 10 at its far right hand end as viewed in FIGURE 1. Track switch 340 is actuated by the front wheels of the front truck of freight car 13, but not until after track switch 214 has completed its timing function and the weighing operation thus far described has completed its function.

Upon actuation of track switch 340, there is completed an energizing circuit for printing control relay 300, which circuit extends from line 205, over switch 208, line 205, wiper 266–1, tap 266a–1 of wafer 266a, over taps 266a–2 to 266a–11 (which are strapped together), contacts 255a, contacts 257a, track switch 340, and the winding of relay 300 to line 206.

Printing control relay 300, at its contacts 300b closes its own holding circuit which extends from line 205, over switch 208, line 205, wiper 266–1, tap 266a–1 of wafer 266a, over taps 266a–2 to 266a–11, contacts 300b, and the winding of relay 300 to line 206. At its contacts 300a (FIG. 4) relay 300 interrupts the energizing circuit for reference winding 308 to servomotor 48 and prevents further rotation of the servomotor. At its contacts 300c (FIG. 5), relay 300 completes an energizing circuit for printer control stepping switch 266. Stepping switch 266 is a stepping switch of the "Ledex" type described hereinbefore. Switch 266 comprises a plate 342, having a slot 344 for receiving a wiper 346. Plate 342 is connected to a shaft 348 which rotates therewith. A cam follower 350 connected to a cam surface on shaft 348 controls the opening and closing of contacts 352. In this case, switch 266 has twelve steps for each complete revolution of plate 342 and thus each step rotates plate 348 through 30°. A wiper 354 is connected to contacts 352 and is in continuous electrical contact with plate 342. Connected to shaft 348 for rotation therewith are wipers 266–1 (FIG. 3), 266–2 (FIG. 5), and 266–3 (FIG. 5). These wipers are associated with their wafers 266a—266c respectively. Each of the wipers 266a—266c has twelve taps. Thus, wiper 266a contacts each of taps 266a–1 to 266a–12 in sequence, with tap 266a–1 being the home or rest position for wiper 266a. A similar arrangement applies to wafers 266b and 266c and their respective wipers and taps. Thus, as shaft 348 rotates, the wipers 266–1 to 266–3 move along in steps from their first to their twelfth contacts.

Upon closure of contacts 300c in the above-identified manner, an energizing circuit for relay coils 358 and 360 is completed. The energizing path for relay coil 358 extends from line 205, over switch 208, line 205 (FIGS. 3–5), contacts 352, contacts 300c, a current limiting resistor 362, a rectifier 364, and the winding of relay 358 to line 206. An energizing circuit for relay 360 extends from line 205, over switch 208, line 205 (FIGS. 3–5), contacts 352, contacts 300c, current limiting resistance 362, a rectifier 366 and the winding of relay coil 360 to line 206. Time delay condensers 370 and 372 are connected across the windings of relays 358 to 360 respectively.

The stepping circuit for switch 266 includes a coil 374 (FIG. 5) in the output circuit of a rectifier 376. In series with coil 374 are contacts 358a which are under the control of relay winding 358. The energizing circuit for stepping coil 374 extends from line 205, over switch 208, line 205 (FIGS. 3–5), current limiting resistor 378, rectifier 376, coil 374 (in the output circuit of rectifier 376), and contacts 358a to line 206. Contacts 360a short out current limiting resistor 378 during the pulsing of coil 374 and re-introduce it after the current pulse to reduce the current flow to rectifier 376 when its output circuit is open.

The operation of stepping switch 266 is similar to that of the two previously described stepping switch circuits; namely, those for switch 170 and 227. In this case, upon closure of contacts 300c, the above described energizing circuits for relay coils 358 and 360 are completed. Relay 358 at its contacts 358a completes the energizing circuit for stepping coil 374. Stepping coil 374 causes rotation of plate 342 through an angle of about 30°. Wiper 346 is moved out of slot 344 and makes continuous electrical contact with plate 342 until it again returns to slot 344 after one complete revolution of plate 342.

Cam follower 350 is actuated by shaft 348 to open contacts 352 whereupon the energizing circuits for relay coils 358 and 360 are interrupted. Contacts 358a and 360a open to interrupt the energizing path for stepping coil 374. At this time, plate 342 has completed a rotation through an angle of about 30°, as also has shaft 348. As previously discussed the wipers 266–1 to 266–3 move along their respective wafers 266a to 266c to contact in sequence their respective taps in positions 1–12.

Before continuing with the explanation of the electrical connections established by stepping switch 266, the function and operation of the indicator and read-out mechanism 50 and the printer 55 will be considered.

Referring more specifically to FIGURE 7, there is therein shown the mechanical arrangement for establishing an electrical read-out circuit which can be used to actuate a printer in recording the weight of an object on track section 10. There are herein shown an indexing wheel or disc 380 and a plurality of stepped selector discs 381—383, each of the latter of which corresponds respectively to one of the numerical denominations "hundreds," "thousands" and "ten thousands." The discs 380—383 are connected to a common shaft 51, which in turn is mechanically linked to the servomotor 48 over a reduction gear 338 (FIG. 8). Thus, as servomotor 48 turns, indexing wheel 380 and selector discs 381—383 are positioned. Additionally fingers 386—389 are connected to and arranged to be urged by their respective coil springs 392—395 toward their respective ones of the discs 380—383 and are positioned in accordance with the particular steps of their associated selector discs which they engage. A fixed member 398 engages one of the ends of each of springs 392—395 to provide means against which they exert a pulling force to urge their respective fingers forward.

At the ends of fingers 386—389 away from their disc engaging ends, there are bosses or enlargements 402—

405. The fingers 386—389 extend through slots (not shown) in a bar 400 which lies inwardly of the bosses 402—405. It can be seen that if bar 400 is moved rearwardly, it catches the bosses 402—405 and pulls fingers 386—389 away from engagement with their respective indexing and selector discs. Bar 400 is urged rearwardly by a mechanical device 410. Bar 400 is also locked in retracted position by a latch mechanism 412 comprising a catch member 413 and a pivoted L-shaped member 415. Member 415 is pivoted at a pin 416 and has a slot 418 in its upper end to receive an extension 420 of bar 400. When catch member 413 engages the lower portion of L-shaped member 415, the extension 420 is held in slot 418 and bar 400 is locked in its retracted position. When catch member 413 releases the lower end of L-shaped member 415, the latter rotates sufficiently to release extension 420. Thereupon, bar 400 moves forward and allows the fingers 386—389 to engage their respective indexing and selector discs.

For details of the structure and operation of stepped selector discs 380—383, and fingers 386—389, reference may be had to Patent No. 2,070,011, issued to H. A. Hadley et al., on February 9, 1937, and Patent No. 2,792,208, issued to J. C. Merrill et al., on May 14, 1957, both patents being assigned to the present assignee.

In addition to the above described structure, the mechanical to electrical read-out mechanism of FIGURE 7 has been modified from that shown in the above-cited patents in the following manner. Associated with respective ones of the fingers 387—389 are semicircular insulating wafers 422—424. Since the mechanical arrangement for fingers 387—389 and their respective wafers 422—424 is identical, only that for finger 387 will be described in detail, it being understood that an analogous description applies to fingers 388 and 389.

Wafer 422 has ten contacts 422–1 to 422–10 spaced at equal intervals around its periphery. A wiper 426 is pivoted for rotational movement to complete an electrical circuit over any one of the ten contacts 422–1 to 422–10. Wiper 426 is connected to a gear wheel 427 which engages teeth on its associated finger 387. Finger 387 and gear wheel 427 form a rack and pinion arrangement such that the amount of forward movement of finger 387 determines the amount of rotation of gear wheel 427. As gear wheel 427 rotates it carries with it wiper 426 which completes an electrical circuit over one of the contacts 422–1 to 422–10.

Thus, for example, if selector disc 381 is rotated through an angle representing 500 pounds, when finger 387 is urged forward to engage the selector disc, it moves forward a distance sufficient to rotate wiper 426 through an angle sufficient to have wiper 426 establish an electrical circuit over contact 422–5. In an analogous fashion wipers 428 and 430 associated with fingers 423 and 424 respectively can be rotated to complete their respective electrical circuits.

The electrical circuits established over wafers 422—424 are shown in FIGURES 5 and 6 to which reference is now made.

The contact portions of wipers 426, 428 and 430 are as shown in FIGURE 6. For convenience, the wafers 422—424 are shown with their respective contacts in a straight line, although in actual practice they are as shown in FIGURE 7.

Wiper 426 connected to finger 387 (the "hundred's" denomination) is connected over a conductor 435 to tap 266c–8 (FIG. 5) of wafer 266c of stepping switch 266. Wiper 428 connected to finger 388 (the "thousand's" denomination), is connected over a conductor 436 to tap 266c–7 (FIG. 5) of wafer 266c of stepping switch 266. Wiper 430, connected to finger 389 (the "ten thousand's" denomination), is connected over a conductor 437 to tap 266b–6 (FIG. 5) of wafer 266b of stepping switch 266.

Taps 422–0 to 422–9 of wafer 422 are connected to respective ones of the taps 423–0 to 423–9 of wafer 423 and to respective operating solenoids 440–449 of printer 55.

Printer 55 may comprise a conventional adding machine which is capable of accumulating digits by the reception of electrical signals. Such a machine may be purchased from the Friden Calculating Machine Company and is sold as Model ABST. Printing solenoids 440—449 are part of the adding machine or printer 55 which accumulates digits and prints them on tape, card, or other recording media. The internal mechanism per se of printer 55 does not form a part of the present invention.

In the type of printer 55 herein used, to accumulate a given digit it is necessary to energize only that solenoid of the group 440—449 associated with the given digit. In the present case the solenoids 440—449 correspond to the digits 0–9, respectively.

To give a typical example of the energizing circuit for one of the solenoids 440—449, a circuit for solenoid 440 extends from line 205 (FIG. 3) over switch 208, line 205 (FIGS. 3–5), a current limiting resistance 452, a rectifier circuit comprising the parallel connection of rectifiers 454 and 455, resistance 456, normally closed contacts 360b, wiper 266–3, tap 266c–8 of wafer 266c, conductor 435, wiper 426, tap 422–0, terminal B0 and solenoid 440 to line 206. The manner in which this energizing path is established will become clear hereinafter. However, in analogous fashion paths for the operation of each of the digit solenoids 440—449 of the printer may be traced.

In the diagrammatic view of FIG. 6, terminals B0 to B9 are shown in series with solenoids 440—449 respectively. These terminals B0–B9 are common junction points to which leads from other parts of the read-out circuit are connected. For example, in the extreme right lower portion of FIGURE 6 appears a conductor terminating at terminal B3. This conductor may therefore be considered to be connected to terminal B3 in series with solenoid 443. The horizontal conductors terminating in the symbols B0 to B9 are similarly connected to their respective ones of the terminals B0—B9 in series with solenoids 440—449.

The accumulation of digits in printer 55 has been alluded to hereinbefore and an example of the manner in which this is accomplished is as follows. The printer 55 is a sequentially operated device in that the last digit fed into the printer 55 is always the "unit's" digit, the penultimate digit fed in is always the "ten's" digit and so forth for any size decimal number up to the capacity of the printer 55. Thus, if the number 195,000 is to be accumulated in printer 55, digit "1" is fed in first, the digit "9" is fed in second, the digit "5" is fed in third and then three zeros are inserted in sequential fashion. As each succeeding digit is fed in, each of the previous digits is moved one denomination higher, until the complete decimal number is fed into the machine.

Since the information regarding the weight of freight car 13 and its contents is derived from two sources; namely, range bridge 30 and rebalance bridge 40 (the latter through selector discs 381—383), it is necessary to add the data stored in these two sources before the printer can be given the proper total for recording purposes. It is the function of the circuit of FIGURE 6 to do this addition or calculation. To illustrate the problem in sharper detail, it will be recalled that the visual indication of the weight was accomplished by a lamp, which indicated the weight information from the range bridge 30, and the dial 330 and pointer 333, which indicated the weight information from the rebalance bridge 40. A mental step of addition was required on the part of the operator to add these two different pieces of information. This mental step has to be eliminated when the printer 55 is used, and the circuit of FIGURE 6 accomplishes the addition of the information from these two sources.

Reference is now made to a matrix 470 which comprises the complex of relay contacts forming energizing paths for solenoids 440—443 of printer 55. Since the scale herein shown has a capacity of 300,000 pounds, the highest number that the first or "hundred thousand's" digit can be is three. This first digit may be three, two, one or zero. The energizing path to operate the proper one of the solenoids 440—443 of printer 55 is established over matrix 470 by operation of relay coils 460—465. Energizing paths for relay coils 460—465 are completed over contacts 424–0, 424–1, 424–2, 424–3, 424–4, 424–5 of the "ten thousand's" wafer 424. The contacts closed by the relays 460—465 in their de-energized condition is as shown and the paths thereby established may be traced therethrough. If any of the relays 460—465 is energized, its alternate contacts are closed by movement of its armature to an alternate position. Matrix 470 functions to combine data from range bridge 30 and rebalance bridge 40, as reflected by the stepping switch 170, associated with the range bridge 40, and the read-out circuit comprising selector disc 383, finger 389, wiper 430 and its taps on wafer 424 associated with rebalance bridge 40.

In the center of FIGURE 6, is shown another complex 471 of possible energizing paths for printer 55. This complex 471 comprises wafers 170i—170j of stepping switch 170 and their respective associated wipers and taps. It will be recalled that wipers 170–5 to 170–10 are positioned by stepping switch 170 in accordance with the operation of the range bridge 30. A path for energization of one of the solenoids 440—449 of printer 55 is established over the complex 471 by the combined operation of the read-out associated with the range bridge 30 and the rebalance bridge 40. This complex 471 provides the second or "ten thousand's" digit of the weight fed into the printer 55.

The third or "thousands" digit of the weight is fed to printer 55 over the circuit comprising wiper 428 and wafer 423 associated with selector disc 382 in the indicator and read-out mechanism 50. The fourth or "hundreds" digit of the weight is fed to printer 55 over the circuit comprising wiper 426 and wafer 422 associated with selector disc 381 in the indicator and read-out mechanism 50.

Since the scale of the invention is not designed to indicate or record weight within a tolerance of greater than 100 pounds, the tens and units digits are merely fed into printer 55 by energizing solenoid 440 twice in succession, after all the other digits have been inserted in printer 55 in the above order.

Having described in some detail the construction and function of the various components of the printing and calculating circuits of the invention, the operation of the system, using the example of 195,000 pounds, will now be continued.

It will be recalled that upon closure of contacts 300c at the time second track switch 340 closed its contacts, stepping switch 266 began its stepping sequence. It will also be recalled that as a result of the operation of switch 170 in the weighing phase, all the wipers 170–1 to 170–10 of switch 170 rest on their respective #5 taps.

At its wafer 266b, stepping switch 266 moves its wiper 266–2 to tap 266b–2 to complete an energizing circuit for a coil 475 which operates latch 413 to release pivoted member 415. Rotation of member 415 releases bar 400. As bar 400 moves forward, fingers 386—389 are released and urged against their respective indexing and selector discs 380—383. Indexing finger 386 is made slightly longer than the other fingers 387—389 so that it engages indexing wheel 380 before the other fingers engage their respective selector discs.

Fingers 387—389 engage their respective selector discs 381—383 and their respective wipers 426, 428 and 430 are rotated to reflect the weight information carried by the selector discs. Thus, since of the 195,000 pounds on track section 10, 180,000 pounds are reflected in range bridge 30, 15,000 pounds are reflected in selector discs 380—383.

Hence, wiper 430, operatively connected to the "ten thousand's" finger 389, moves to tap 424–1 of its associated wafer 424. Wiper 428, operatively connected to the "thousands" finger 388, moves to tap 423–5 of its associated wafer 423; and wiper 426, operatively connected to the "hundreds" finger 387, does not move at all but remains on tap 422–0 of its associated wafer 422.

Stepping switch 266 again advances wipers 266–1, 266–2 and 266–3 to taps 266a–3, 266b–3, and 266c–3 of their respective wafers 266a, 266b and 266c.

Stepping switch 266 again advances wipers 266–1, 266–2 and 266–3 to taps 266a–4, 266b–4 and 266c–4 of their respective wafers 266a, 266b and 266c.

At tap 266b–4, wiper 266–2 completes an energizing circuit for relay 461 (FIG. 6), which circuit extends from line 205 (FIG. 3), over switch 208, line 205 (FIGS. 4 and 5), wiper 266–2 of switch 266, taps 266b–4, 266b–5 and 266b–6 of wafer 266b, (which taps are shorted together), conductor 437 (FIGS. 5 and 6), wiper 430, tap 424–1 of wafer 424 and the winding of solenoid 461 to line 206 (FIGS. 6–3).

Relay 461 operates and closes its contacts 461a in complex 471 and 461b in matrix 470.

Stepping switch 266 again advances wipers 266–1, 266–2 and 266–3 to taps 266a–5, 266b–5, and 266c–5 of their respective wafers 266a, 266b and 266c. As wipers 266–1, 266–2 and 266–3 advance from tap to tap the circuits they have completed are interrupted and the energized relays are then de-energized between steps.

At tap 266b–5, wiper 266–2 again completes the energizing circuit for relay 461. At tap 266c–5, wiper 266–3 completes an energizing circuit for printer solenoid 441, which circuit extends from line 205, over switch 208, line 205 (FIGS. 3–5), current limiting resistor 452, the parallel combination of rectifiers 454 and 455, resistor 456, contacts 360b, wiper 266–3, tap 266c–5 of wafer 266c, conductor 478 (FIGS. 5 and 6), wiper 170–4, tap 170d–5 of wafer 170d, contacts 462b, 463b, 464d, and 465d of matrix 470, terminal B1 and solenoid 441 of printer 55 to line 206. Energization of solenoid 441 of printer 55 inserts the digit one (1) into the units denomination of the printer where it is held pending further actuation.

Stepping switch 266 again advances its wipers 266–1, 266–2, and 266–3 to taps 266a–6, 266b–6 and 266c–6 of wafers 266a, 266b and 266c respectively. At taps 266b–6 wiper 266–2 of wafer 266b again completes the energizing circuit for relay 461 which operates and closes its contacts 461a and 461b.

At tap 266c–6, wiper 266–3 of wafer 266c, completes an energizing circuit for solenoid 449 of printer 55, which circuit extends from line 205, over switch 208, line 205 (FIGS. 3–5), current limiting resistance 452, the parallel circuit of rectifiers 454 and 455, resistance 456, contacts 360b, wiper 266–3, tap 266c–6, conductor 480 (FIGS. 5 and 6), contacts 461a, wiper 170–6, tap 170f–5 of wafer 170f, terminal B9, and solenoid 449 of printer 55 to line 206. Upon operation, solenoid 449 of printer 55 moves the previously inserted digit "1" to the "ten's" denomination and inserts the digit "9" into the "unit's" denomination of the printer pending further actuation.

Stepping switch 266 again advances its wipers 266–1, 266–2 and 266–3 to taps 266a–7 266b–7 and 266c–7 of wafers 266a, 266b and 266c, respectively. At tap 266c–7, wiper 266–3 completes an energizing circuit for solenoid 445 of printer 55, which circuit extends from line 205, over switch 208, line 205 (FIGS. 3–5), resistance 452, the parallel combination of rectifiers 454 and 455, resistance 456, contacts 360b, wiper 266–3, tap 266c–7 of wafer 266c, conductor 436 (FIGS. 5 and 6), wiper 428, tap 423–5 of wafer 423, and solenoid 445 of printer 55 to line 206.

Upon operation, solenoid 445 of printer 55 moves the previously inserted digits "1" and "9" to the "hundred's" and "ten's" denominations, and inserts the digit "5" into the "unit's" denomination of the printer pending further actuation.

Stepping switch 266 again advances its wipers 266-1, 266-2, and 266-3 to taps 266a-8, 266b-8 and 266c-8 of wafers 266a, 266b and 266c respectively. At tap 266c-8, wiper 266-3 completes an energizing circuit for solenoid 440 of printer 55, which circuit extends from line 205, over switch 208, line 205 (FIGS. 3-5), resistance 452, the parallel combination of rectifiers 454 and 455, resistance 456, contacts 360b, wiper 266-3, tap 266c-8 of wafer 266c, conductor 435 (FIGS. 5 and 6), wiper 426, tap 422-0 of wafer 422, and solenoid 440 of printer 55 to line 206.

Upon operation, solenoid 440 of printer 55 moves the previously inserted digits "1," "9," and "5" to the "thousand's," "hundred's," and "ten's" denominations, and inserts the digit "0" into the "units" denomination of the printer 55.

Stepping switch 266 again advances its wipers 266-1, 266-2 and 266-3 to taps 266a-9, 266b-9 and 266c-9 of wafers 266a, 266b and 266c, respectively. At tap 266c-9, wiper 266-3 completes an energizing circuit for solenoid 440 of printer 55, which circuit extends from line 205, over switch 208, line 205 (FIGS. 3-5), resistance 452, the parallel combination of rectifiers 454 and 455, resistance 456, contacts 360b, wiper 266-3, tap 266c-9 of wafer 266c, tap 266c-10 (shorted to tap 266c-9), conductor 481 (FIGS. 5 and 6) terminal B0, and solenoid 440 of printer 55.

Upon operation, solenoid 440 of printer 55 moves the previously inserted digits "1," "9," "5" and "0," to the "ten thousand's,", "thousand's," "hundred's" and "ten's" denominations, and inserts the digit "0" into the "unit's" denomination of the printer 55.

Stepping switch 266 again advances its wipers 266-1, 266-2 and 266-3 to taps 266a-10, 266b-10 and 266c-10 of wafers 266a, 266b and 266c, respectively. At tap 266c-10, wiper 266-3 completes an energizing circuit for solenoid 440 of printer 55, which circuit extends from line 205, over switch 208, line 205 (FIGS. 3-5), resistance 452, the parallel combination of recifiers 454 and 455, resistance 456, contacts 360b, wiper 266-3, tap 266c-10 of wafer 266c, conductor 481 (FIGS. 5 and 6), terminal B0, and solenoid 440 of printer 55 to line 206.

Upon operation, solenoid 440 of printer 55 moves the previously inserted digits "1," "9," "5," "0," and "0" to the "hundred thousand's," "ten thousands," "thousand's," "hundred's" and "ten's" denominations, and inserts the digit "0" into the "unit's" denomination of the printer 55.

At this point, it is thus seen that the number 195,000 is accumulated in the printer 55.

Stepping switch 266 again advances its wipers 266-1, 266-2 and 266-3 to taps 266a-11, 266b-11 and 266c-11 of wafers 266a, 266b and 266c, respectively.

No further circuits are completed over the number 11 taps of the wafers, and all previously energized relays of the read-out circuit of FIGURE 6 are released.

Stepping switch 266 again advances its wipers 266-1, 266-2 and 266-3 to taps 266a-12, 266b-12 and 266c-12 of wafers 266a, 266b and 266c, respectively. At tap 266a-12 of wafer 266a, switch 266 interrupts the entire holding circuit for relays 255 and 300.

As relay 255 relaxes, it opens its contacts 255a (thereby further interrupting its own holding circuit), its contacts 255b (which interrupt the stepping circuit of stepping switch 170 (FIG. 4)), its contacts 255c (which interrupts the holding circuit for relay 275 and the energizing circuit for the reference winding 308 of servomotor 48), and closes its contacts 255d (in the alternate stepping circuit for stepping switch 170, FIG. 4).

At its now closed contacts 255d, relay 255 recompletes an energizing circuit for stepping coil 279 of switch 170, which circuit extends from line 205, over switch 208, line 205, conductor 292, contacts 180, wiper 178, plate 171 wiper 177, contacts 255d, resistance 293, rectifier 295, and relay 287 to line 206. Relay 287 at its contacts 287a completes the energizing circuit for stepping coil 289. Thus, stepping switch 170 is advanced until wiper 177 again falls into slot 175, whereupon the energizing circuit for relay 287 is interrupted.

At this time wipers 170-1 to 170-10 are advanced to and rest on taps 170a-2 to 170j-2, their home or rest positions.

Returning now to relay 300, whose energizing circuit was interrupted by advancement of wiper 266-1 of switch 266 to tap 266a-12 of wafer 266a, it relaxes and operates its contacts 300a, 300b and 300c.

At its contacts 300a, relay 300 prepares the energizing circuit for the reference winding 308 of servomotor 48 for operation during the next following weighing cycle. At its contacts 300b, relay 300 further interrupts its own holding circuit and at its contacts 300c, relay 300 interrupts the start stepping circuit of stepping switch 266 so that it will not continue advancement after its stepping circuit over wiper 346 is interrupted.

It will be recalled that relay 275 was de-energized by the opening of contacts 255c. Relay 275 relaxes and at its contacts 275a recompletes the energizing circuit for relays 182 and 276 (right hand part of FIG. 4). At its contacts 275b, it interrupts the shorting path around balance detector contacts 201 so that they will regain control for the next weighing operation. At its contacts 275c, relay 275 prepares the stepping circuit for stepping switch 170 in anticipation of the next weighing cycle.

Relay 182 operates and at its contacts 182a (in compensation bridge 35), reintroduces a voltage equivalent to 10,000 pounds in preparation for the next weighing cycle.

Relay 276 operates, and moves the armature of switch 39 (FIGS. 1 and 2) to connect the output of compensation bridge 35 to amplifier and balance detector circuit 15 and eliminate the effect of rebalance bridge 40 from the circuit.

It will be recalled that stepping switch 266 moved its wiper 266-2 to tap 266b-12 of wafer 266b, whereat it completes an energizing circuit for relay 485, which circuit extends from line 205, over switch 208, line 205 (FIGS. 3-5), wiper 266-2, tap 266b-12 of wafer 266b and the winding of relay 485 to line 206.

Relay 485 operates and at its contacts 485a completes an energizing circuit for a latching relay 490, which circuit extends from line 205, over switch 208, line 205 (FIGS. 3-5), contacts 485a and the winding of relay 490 to line 206.

Latch relay 490 operates retracting mechanism 410 (FIG. 7) to move bar 400 rearwardly and thus, fingers 386—389 away from engagement with their discs 380—383 respectively and free the wheels and shaft 51 in preparation for the next weighing operation. As bar 400 rotates, its extension 420 engages slot 418 and causes member 415 to pivot around pin 416 until catch 413 reengages its lower end. At this time, bar 400 is held in retracted position until its next release.

Stepping switch 266 also moves its wiper 266-3 to tap 266c-12 of wafer 266c whereat it completes a circuit for the printing solenoid 500 of printer 55, which circuit extends from line 205, over switch 208, line 205 (FIGS. 3-5), resistance 452, the parallel combination of rectifiers 454 and 455, resistance 456, contacts 360b, wiper 266-3, tap 266c-12 of wafer 266c, conductor 501 and the winding of solenoid 500 to line 206.

Solenoid 500 operates and causes the printer 55 to print on a tape or other permanent media the weight (195,000 pounds) which was set into the printer by the accumulation of digits as above described. In this way a permanent record of the weight is made.

Stepping switch 266 again advances and its wiper 346 falls into slot 344 of plate 342. This interrupts the further stepping action of switch 266 and leaves its wipers 266-1, 266-2 and 266-3 on taps 266a-1, 266b-1, and 266c-1 of their respective wipers 266a, 266b and 266c.

The circuit is thus restored to its original condition preparatory for the weighing of the next freight car to pass over track section 10.

Certain safety and manual operating features are provided to allow the weighing and printing system to be operated even if either or both of track switches 214 and 340 prove defective.

A manual switch 510 (FIG. 3) is provided which when closed, completes an energizing path for relay 255. The operation of the weighing system then continues in the manner above described without the necessity of track switch 214 having to count the wheels of the freight car. Switch 510, thus, provides for operation of the system even if track switch 214 fails.

Another manual switch 512 is provided which when closed, completes an energizing circuit for relay 300. The operation of the system continues in the manner described without the necessity of closure of track switch 340 which was used to start the printing cycle.

A third manual switch 515 located in the advancing circuit for stepping switch 227, is provided which when closed completes energizing circuits for relays 257 and 262. Relay 262 operates and in the manner hereinbefore described restores stepping switch 227 to its home or rest position. Relay 257 operates and opens its contacts 257a which interrupt the holding circuit for relay 255. Relay 255 restores and in the manner hereinbefore described, causes stepping switch 170 to restore to its home or rest position.

There has hereinbefore been described an embodiment of a force measuring system which rapidly weighs and indicates the weight visually and in permanent form of objects moving rapidly over a weighing platform.

For practical design purposes, the present invention has an added feature which renders it less liable to error. This feature is the use of a rebalance bridge 40 which is designed so as to produce maximum countervoltage equal to twice the span of measurement of the range bridge 30. Specifically, the rebalance bridge 40 is capable of generating a voltage equivalent to 60,000 pounds (twice the 30,000 pound span of measurement of range bridge 30). The indicator 330 is capable of visually indicating a weight of 60,000 pounds and the read-out mechanism 50 is also designed to handle 60,000 pounds. The manner in which this added feature functions to advantage may be explained with reference to the function of range bridge 30. At times range bridge 30 may stop on a range one step below the desired range. Thus, for a weight of 195,000 pounds, the range bridge 30 may stop on a range which represents 150,000 pounds, rather than the 180,000 pound range. In this case, the rebalance bridge 40 merely generates a voltage whose magnitude represents 45,000 pounds. The indicator 330 and read-out mechanism 50 then reflect the addition of the 45,000 pounds and the visual and printed information is produced in the manner previously described.

The structure and operation of compensation bridge 35 have been set forth in detail hereinbefore, however, it would be well to emphasize its function in the circuit. It has been found that the action of the balance detector part of amplifier and balance detector 15 is not as stable and sensative as is desired. Specifically, it has been found that for scale loads near any given range of the range bridge 30, the balance detector contacts 201 operate before a complete phase reversal of the voltage at the input to amplifier and balance detector 15 has taken place. For example, if a weight of 179,900 pounds is on platform 10, the balance detector contacts 201 may, because of lack of proper sensitivity, close when the range bridge 30 reaches range 180,000 pounds. If this occurs, then the printer 55 will readout 180,000 pounds, and the lamp bank will indicate 180,000 pounds. Because of this lack of sensitivity, an error of 100 pounds has been made and this error cannot be compensated for in the rebalance bridge 40 because this bridge cannot remove an equivalent weight voltage but only add equivalent weight voltage to that of bridge 30.

However, with the presence of compensation bridge 35, in the circuit, a weight of 179,900 pounds on the scale platform is reduced to an equivalent weight of 169,900 pounds by the compensating bridge 35 and this weight is 10,100 pounds lower than the range of 180,000 pounds. The sensitivity of the balance detector is, however, not so poor as to cause it to choose the wrong range when confronted by a voltage difference equivalent to 10,100 pounds. Therefore, the lack of sensitivity of the balance detector in this case is not serious. On the other hand, if the weight on the platform were 189,900 pounds; then, because of the presence of the compensating bridge 35, an equivalent weight of 179,900 pounds would be presented to range bridge 30. Now, because of its poor sensitivity, the balance detector part of amplifier and balance detector 15 could select either the 150,000 pound range or the 180,000 pound range. Whichever is selected, no difficulty is experienced by the scale because after the effect of the compensating bridge 35 is eliminated, the rebalance bridge 40 inserts enough equivalent voltage to achieve an electrical null balance. If the range bridge 30 had stopped on the 150,000 pound range, the rebalance bridge 40 would have inserted the voltage equivalent of 39,900 pounds. If the range bridge 30, had stopped on the 180,000 range, the rebalance bridge would have inserted the voltage equivalent of 9,900 pounds. In any case, the scale using the compensation bridge 35 would never have range bridge 30 stop in a range which would require rebalance bridge 40 to go back of zero for balancing the system.

The present invention, therefore, is a force measuring system which weighs an object moving rapidly over a sensing device in a minimum time and allows high speed weighing of successive objects. It also gives visual and recorded information of the weight of the object.

While a specific embodiment of the present invention is herein shown and described, other modifications, changes and rearrangements may be made by those skilled in the art without exceeding the scope of the appended claims.

We claim:

1. A force measuring system for measuring the amount of a force of unknown magnitude comprising: means for converting said force into an equivalent electrical force of proportional magnitude, a first means connected to said converting means for producing an electrical force of a magnitude greater than that of said proportional force and in opposition thereto, means for reducing the magnitude of the force of said first means to an amount less than that of said equivalent force, a second means for generating a second electrical force equal in magnitude and in opposition to the difference in magnitude between that of said force of said first means and that of said equivalent force, said second means being effective only when in series circuit connection with said first means and said converting means, control means for completing the series circuit connection after said reduction of the magnitude of said force of said first means, and recording means connected to said first means and said second means for producing a record of the amount of said unknown force.

2. A force measuring system for measuring the amount of a force of unknown magnitude comprising: means for converting said force into an equivalent electrical force of proportional magnitude, a first means connected to said converting means for producing an electrical force of a magnitude greater than that of said proportional force and in opposition thereto, means for reducing the magnitude of the force of said first means in discrete amounts to an amount less than that of said equivalent force, a second means for generating a second electrical force in opposition to the difference in magnitude between that of said force of said first means and that of said equivalent force, means connected to said second means for increasing in a continuous manner the magnitude of the force of said second means until said force is equal in magnitude to the difference in magnitude between that of said first means and that of said equivalent force, said second means being effective only when in series circuit connection with said first means and said converting means, control means for completing the series circuit connection after said reduction of the magnitude of said force of said first means, and recording means connected to said first means and said second means for producing a record of the amount of said unknown force.

3. A force measuring system for measuring the amount of a force of unknown magnitude comprising: means for converting said force into an equivalent electrical force of proportional magnitude, a first means connected to said converting means for producing an electrical force of an initial magnitude greater than that of said proportional force and in opposition thereto, compensation means connected to said first means for reducing the magnitude of said equivalent force by a predetermined amount, means for reducing the magnitude of the force of said first means in discrete amounts to an amount less than that of said reduced equivalent force, sensing and control means for sensing the condition wherein said magnitude of the force of said first means is less than that of said reduced equivalent force and for then eliminating the effect of said compensating means to restore said equivalent force to its initial amount, a second means for generating a second electrical force in opposition to the difference in magnitude between that of said force of said first means and that of said equivalent force, means connected to said second means for increasing in a continuous manner the magnitude of the force of said second means until said force is equal in magnitude to the difference in magnitude between that of said first means and that of said equivalent force, said second means being operatively connected in series with said first means and said converting means after said reduction of the magnitude of said force of said first means, and recording means connected to said first means and said second means for producing a record of the amount of said unknown force.

4. A force measuring system as recited in claim 3 in which said sensing and control means includes an amplifier, a detector for sensing a balance condition in the force system and a servomotor, said servomotor being connected to said amplifier for actuation in response to a signal therefrom and being further connected to said second means for increasing the magnitude of the force generated therein.

5. A force measuring system comprising: transducer means for converting a force into a voltage signal whose magnitude is proportional to said force, a first counter voltage producing circuit connected in series with said transducer means for producing a voltage in phase opposition to and greater than said force produced voltage, a second countervoltage producing circuit connectable in series with said first countervoltage producing circuit, for producing a voltage in phase opposition to said force produced voltage, an initially open series circuit connection between said first and second circuits, means for reducing the magnitude of the voltage of said first countervoltage producing circuit to a value less than that of said transducer means, means connected to said transducer means and said first circuit for sensing the difference in voltage between that of said transducer means and that of said first countervoltage generating circuit, control means responsive to said sensing means for closing said series circuit connection, means connected to said sensing means and said second countervoltage producing circuit for increasing the magnitude of the voltage of said second circuit to equal the said voltage difference, and means connected to both said first and second countervoltage circuits for indicating the amount of said force.

6. A weighing system for weighing a physical object having sets of wheels comprising: a transducer for generating a voltage signal whose magnitude is proportional to the weight of said object, a first countervoltage producing circuit connected in series with said transducer for producing a voltage in phase opposition to and greater than the magnitude of said transducer voltage, a second countervoltage producing circuit for producing a voltage in phase opposition to said transducer voltage, an initially open series circuit connection between said first and second circuits, means for reducing the magnitude of the voltage of said first countervoltage producing circuit to a value less than that of said transducer, a counting circuit operatively connected for actuation by at least one wheel of each set of wheels for initiating operation of said voltage reducing means, means connected to said transducer and said first circuit for sensing the difference in voltage between that of said transducer and that of said first countervoltage generating circuit, control means responsive to said sensing means for closing said series circuit connection, means connected to said sensing means and said second countervoltage producing circuit for increasing the magnitude of the voltage of said second circuit to equal the said voltage difference, and means connected to both said first and second countervoltage circuits for indicating the weight of the physical object.

7. A weighing system for weighing a physical object having sets of wheels comprising: a transducer for generating a voltage signal whose magnitude is proportional to the weight of said object, a first countervoltage producing circuit connected in series with said transducer for producing a voltage in phase opposition to and greater than the magnitude of said transducer voltage, compensation means connected to said first means for reducing the magnitude of said transducer voltage by a predetermined amount, a second countervoltage producing circuit for producing a voltage in phase opposition to said transducer voltage, means for reducing the magnitude of the voltage of said first countervoltage producing circuit to a value less than that of said transducer, a counting circuit operatively connected for actuation by at least one wheel of each set of wheels for initiating operation of said voltage reducing means, means connected to said transducer and said first circuit for sensing the difference in voltage between that of said transducer and that of said first countervoltage generating circuit, means connected to said sensing means and said second countervoltage producing circuit for increasing the magnitude of the voltage of said second circuit to equal the said voltage difference, and means connected to both said first and second countervoltage circuits for indicating the weight of the physical object.

8. A weighing system for weighing a physical object having sets of wheels comprising: a transducer for generating a voltage signal whose magnitude is proportional to the weight of said object, a first countervoltage producing circuit connected in series with said transducer for producing a voltage in phase opposition to and greater producing a voltage in phase opposition to and greater than the magnitude of said transducer voltage, a second countervoltage producing circuit for producing a voltage in phase opposition to said transducer voltage, an initially open series circuit connection between said first and second circuits, means for reducing the magnitude of the voltage of said first countervoltage producing circuit to a value less than that of said transducer, a counting circuit operatively connected for actuation by at least one wheel of each set of wheels for initiating operation of said voltage reducing means, means connected to said transducer and said first countervoltage producing circuit for sensing the difference in voltage of that of said transducer and that of said first countervoltage producing circuit, control means responsive to said sensing means for closing said series circuit connection, means connected to said sensing means and said second countervoltage producing circuit for increasing the magnitude of the voltage of said second circuit to equal the said voltage difference, means connected to both said first and second countervoltage circuits for indicating the weight of the physical object, and switch means in control of said indicating means for causing operation thereof upon switch means actuation by at least one of said wheels of said physical object.

9. A weighing system for weighing an object comprising: a transducer for generating a voltage whose magnitude is proportional to the weight of said object, a first countervoltage producing circuit connected in series with said transducer for producing a voltage in phase opposition to and greater than the magnitude of said transducer voltage, a second countervoltage producing circuit for producing a voltage in phase opposition to said transducer voltage, an initially open series circuit connection between said first and second circuits, means for reducing the magnitude of the voltage of said first countervoltage producing circuit to a value less than that of said transducer, means connected to said transducer and said first countervoltage producing circuit for sensing the difference in voltage between that of said transducer and that of said first countervoltage producing circuit, control means responsive to said sensing means for closing said series circuit connection, servomotor means including a servomotor and a viscous damper connected to said servomotor for reducing the sensitivity of said servomotor, said servomotor means being connected to said sensing means and to said second countervoltage producing circuit for increasing the magnitude of the voltage of said second circuit to equal the said voltage difference, and means connected to said first and second countervoltage producing circuits for indicating the weight of the object.

10. A weighing system for weighing a physical object comprising: a transducer for generating a voltage whose magnitude is proportional to the weight of such object, a first countervoltage producing circuit connected to said transducer for producing a voltage in phase opposition to and greater than the magnitude of said transducer voltage, a second countervoltage producing circuit for producing a voltage in phase opposition to said transducer voltage, a compensation means connected to said first means for reducing the magnitude of said transducer voltage by a predetermined amount, means for sensing the algebraic sum of the voltages of said transducer, said first countervoltage producing circuit and said compensation means, stepping means operatively connected to said first countervoltage producing means for reducing the magnitude of the voltage of said first means in discrete amounts to an amount less than that of said reduced transducer voltage, said sensing means upon sensing said latter condition being operative to eliminate the effect of said compensation means and to stop further action of said stepping switch, a second countervoltage producing circuit for generating a voltage in phase opposition to the difference in voltage between said transducer means and said first circuit, means connected to said sensing means and said second circuit for increasing in a continuous manner the magnitude of the voltage of said second means until said voltage is equal in magnitude to the said voltage difference, said second means being operatively connected in series to said first circuit and said transducer after said reduction of said magnitude of said voltage of said first circuit, and recording means connected to said stepping switch and said second circuit for producing a record of the weight of said physical object.

11. In a weighing scale system having a receiver for an object to be weighed and including first means for producing a voltage proportional to the weight of such object, voltage sensing control unit having an input in circuit with said first means, second means in circuit with said first means for producing voltage in phase opposition to the weight proportional voltage, said second means being operable from a condition producing a predetermined maximum phase opposition voltage, in successive equal voltage decrement steps to a no voltage condition, third means in circuit with said second means for producing a predetermined fixed voltage in phase opposition to the weight proportional voltage, said third means including a switch operable to render the third means ineffective, null balance bridge means operable for producing variable voltage in phase opposition to the weight proportional voltage, said bridge means having an input and an output, a circuit connection between the bridge means output and the input of said control unit, switch means in an initial position connecting said third means to the input of said control unit and effective in a second position to connect said third means to the input of said null balance bridge means, control means operable upon reception of an object to be weighed on said receiver and while the phase opposition voltage produced by said second means is greater than the algebraic voltage sum of the weight proportional voltage and said fixed voltage of said third means, to cause operation of said second means in said successive steps, said control means being under control of said control unit and responding to the sensing thereby of voltage phase change consequent to step operation of said second means to a step wherein the opposition voltage is less than said voltage sum, to cause cessation of step operation of said second means, to cause operation of said switch means to its said second position, and to cause operation of said switch to render said third means ineffective, the input voltage to said control unit then being a net voltage comprising the algebraic sum of the weight proportional voltage, the phase opposition voltage, and the opposition voltage of said null balance bridge means, motor means operated by said control unit responding to said net voltage, for effecting operation of said null balance bridge means to reduce said net voltage to zero, said control unit then causing cessation of motor operation, and indicator means operated in accordance with the operation of said second means and said motor means for indicating the weight of the object weighed.

References Cited in the file of this patent

UNITED STATES PATENTS

| | | |
|---|---|---|
| 2,133,760 | Williams | Oct. 18, 1936 |
| 2,610,052 | Macgeorge | Sept. 9, 1952 |
| 2,631,027 | Payne | Mar. 10, 1953 |
| 2,723,844 | Thurston | Nov. 15, 1955 |
| 2,733,911 | Thurston | Feb. 7, 1956 |
| 2,792,208 | Merrill et al. | May 14, 1957 |
| 2,792,275 | Drillick | May 14, 1957 |
| 2,806,685 | Sande | Sept. 17, 1957 |
| 2,812,170 | Kennedy | Nov. 5, 1957 |
| 2,927,784 | Lyons | Mar. 8, 1960 |